(12) United States Patent
Endo et al.

(10) Patent No.: US 6,943,872 B2  
(45) Date of Patent: Sep. 13, 2005

(54) METHOD FOR SELECTION OF OPTICAL FIBER AND SYSTEM FOR INSPECTION OF OPTICAL FIBER

(75) Inventors: Shinji Endo, Yokohama (JP); Yoshiaki Nagao, Yokohama (JP); Toshiyuki Yamamoto, Yokohama (JP); Toshio Oshima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 254 days.

(21) Appl. No.: 10/395,858

(22) Filed: Mar. 25, 2003

(65) Prior Publication Data

US 2003/0231297 A1 Dec. 18, 2003

(30) Foreign Application Priority Data

Mar. 25, 2002 (JP) .................................... P2002-084001  
Mar. 25, 2002 (JP) .................................... P2002-084012  
Apr. 1, 2002 (JP) .................................... P2002-099126

(51) Int. Cl.[7] ............................................. G01N 21/00  
(52) U.S. Cl. ............................................... 356/73.1  
(58) Field of Search .................... 356/73.1; 250/227.14, 250/227.15; 359/337.11, 337.12; 398/30, 147, 193

(56) References Cited

U.S. PATENT DOCUMENTS 5,933,227 A * 8/1999 Furuhashi .................. 356/73.1  
6,229,631 B1 * 5/2001 Sato et al. .................... 398/30  
6,532,103 B1 * 3/2003 Sakano et al. ......... 359/337.11

FOREIGN PATENT DOCUMENTS

| JP | 9-269279 | 10/1997 |
|----|----------|---------|
| JP | 10-332530 | 12/1998 |

* cited by examiner

Primary Examiner—Tu T. Nguyen  
(74) Attorney, Agent, or Firm—McDermott Will & Emery LLP

(57) ABSTRACT

An optical fiber inspecting system 1A comprises a waveform measuring unit 2 for measuring an OTDR waveform for an optical fiber F to be inspected and a waveform evaluating unit 3 for evaluating an anomaly within the optical fiber. The waveform evaluating unit 3 comprises a calculating part 4 and a detecting part 5. The calculating part 4 calculates the gradient and the amount of change in gradient of the waveform at each time point. The detecting part 5 determines whether or not the gradient and the amount of change in gradient are within a defined allowable range of gradient and a defined allowable range of amount of change, respectively. This realizes an optical fiber inspecting system, an inspection method and a selecting method, all of which enable to detect reliably an anomaly within an optical fiber through an OTDR waveform.

8 Claims, 22 Drawing Sheets

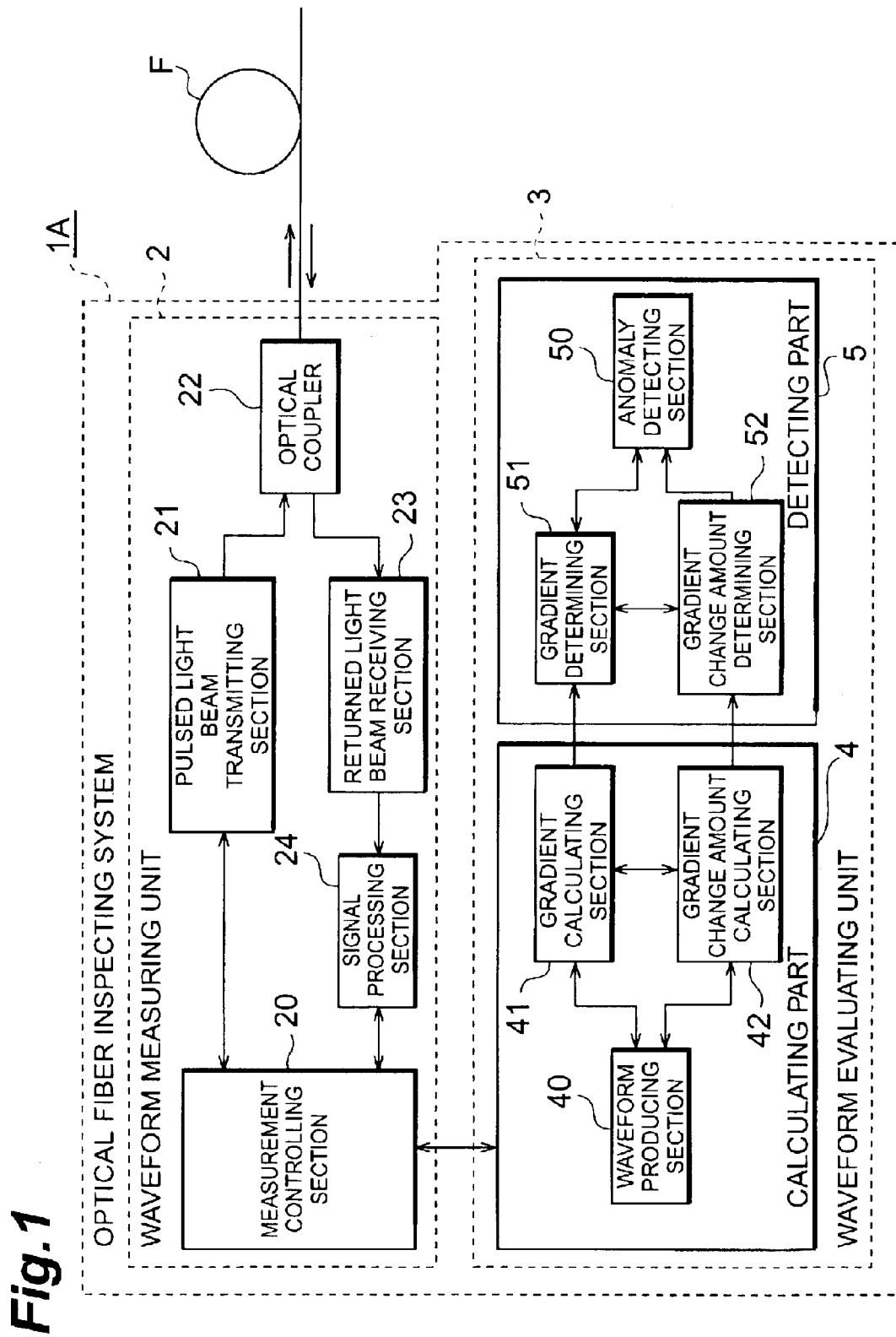

METHOD FOR SELECTION OF OPTICAL FIBER AND SYSTEM FOR INSPECTION OF OPTICAL FIBER

BACKGROUND OF THE INVENTION

1. Field of the Invention

The present invention relates to an optical fiber selecting method for selecting an optical fiber through a use of an OTDR waveform measured by an OTDR system and an optical fiber inspecting system for inspecting an optical fiber.

2. Related Background Art

In order to detect the presence of anomalies within an optical fiber and examine the locations of the anomalies, the range of the anomalies, etc., and then perform the selection or inspection of the optical fiber, a method has been employed in which an OTDR (Optical Time-Domain Reflectometer) waveform due to a backscattering of pulsed light beams is measured to detect the presence of anomalies within an optical fiber. The above-described method for a detection is disclosed, for example, in Japanese Patent Application Laid-open No. H10-332530 and Japanese Patent Application Laid-open No. H9-269279.

In the method for examining an anomaly within an optical fiber through a use of an OTDR waveform, an optical fiber to be examined is connected to an OTDR system and pulsed light beams are inputted to the optical fiber. Then, the power of light beams that are backscattered at the individual locations along the optical fiber and then returned to the OTDR system is detected and then an anomaly within the optical fiber is determined through a use of the waveform (OTDR waveform) in the time domain. The light beams returned to the OTDR system correspond to a loss of the light beams at the individual locations along the optical fiber and therefore, anomalies within an optical fiber can be evaluated based on anomaly points on the waveform.

SUMMARY OF THE INVENTION

In the above-described method for detecting anomalies within an optical fiber, it is important to detect reliably anomalies within the optical fiber through a measured OTDR waveform and then select and inspect-optical fiber based on the result of the detection. Meanwhile Japanese Patent Application Laid-open No. H10-332530 discloses a technique in which an average loss, observed in a measured waveform, in a fiber or a substitutional specified value is used and a difference of the loss from the specified value at each time point is printed out. In the method disclosed, an anomaly within an optical fiber is determined through a visual inspection of an estimator based on printed data on differences from the specified value. For this reason, a criterion for a determination of anomalies does not become clear, preventing reliable evaluation of an anomaly within an optical fiber.

Furthermore, Japanese Patent Application Laid-open No. H9-269279 discloses a method in which an approximated linear line is determined by applying a least-square method to an entire OTDR waveform and an anomaly within an optical fiber is determined based on the gradient of the waveform at a point at which the smoothed waveform and the approximated linear line cross one another, and the length over which a direction of the gradient is the same. However, the method includes a problem. That is, anomalies within an optical fiber cannot be detected as long as the waveform and the approximated linear line do not cross one another. In addition, in this method, it is difficult to deal with a variety of anomalies within an optical fiber because any anomaly is not detected as long as the anomaly does not exist on a cross-point.

The present invention has been made in consideration of the above-described problems and an object of the invention is to provide a method for selecting an optical fiber and a system for inspecting an optical fiber, both of which enable to determine reliably an anomaly within an optical fiber through a use of an OTDR waveform.

In order to achieve the above-described object, an optical fiber selecting method according to the present invention is a method for selecting an optical fiber through a use of a waveform of a power of a light beam in the time domain, in which the light beam is measured by inputting a pulsed light beam to an optical fiber to be selected and detecting the light beam returned from the optical fiber, and the method comprises: (1) a gradient calculating step of calculating gradients of the waveform at each time point; and (2) a selecting step of selecting the optical fiber based on the result of a determination, the result of the determination being obtained by determining whether or not a value of the calculated gradient is within a specific range.

Furthermore, an optical fiber inspecting system according to the present invention is a system for inspecting an optical fiber through a use of a waveform of a power of a light beam in the time domain, in which the light beam is measured by inputting a pulsed light beam to an optical fiber to be inspected and detecting the light beam returned from the optical fiber, and the system comprises: (1) gradient calculation means for calculating gradient of the waveform at each time point; and (2) gradient determination means for determining whether or not a value of the calculated gradient is within a specific range.

In the above-described optical fiber selecting method and inspecting system, a gradient as primary differentiation of an OTDR waveform corresponding to a local loss at individual locations along an optical fiber is calculated and then an anomaly within an optical fiber is detected depending on whether or not the value of the gradient is within a specific range (e.g., a defined allowable range of gradient). In this manner, a detection of an anomaly through a direct use of the values of the gradients of the waveform and selecting/inspecting an optical fiber based on the detection enable an anomaly to be detected or the locations of the anomaly points to be measured precisely, and the anomaly within an optical fiber to be evaluated reliably.

Alternatively, an optical fiber selecting method according to the present invention is a method for selecting an optical fiber through a use of a waveform of a power of a light beam in the time domain, in which the light beam is measured by inputting a pulsed light beam to an optical fiber to be selected and detecting the light beam returned from the optical fiber, and the method comprises: (1) a gradient change amount calculating step of calculating an amount of change in gradient of the waveform at each time point; and (2) a selecting step of selecting the optical fiber based on the result of a determination, the result of the determination being obtained by determining whether or not a value of the calculated amount of change in gradient is within a specific range.

Furthermore, an optical fiber inspecting system according to the present invention is a system for inspecting an optical fiber through a use of a waveform of a power of a light beam in the time domain, in which the light beam is measured by inputting a pulsed light beam to an optical fiber to be inspected and detecting the light beam returned from the optical fiber, and the system comprises: (1) gradient change amount calculation means for calculating an amount of change in gradient of the waveform at each time point; and (2) gradient change amount determining means for determining whether or not a value of the calculated amount of change in gradient is within a specific range.

In the above-described optical fiber selecting method and inspecting system, an amount of change in gradient as secondary differentiation of an OTDR waveform corresponding to change in a local loss at individual locations along an optical fiber is calculated and then an anomaly within an optical fiber is detected depending on whether or not the amount of change in gradient is within a specific range (e.g., a defined allowable range of amount of change). In this manner, detection an anomaly through a use of the value of the amount of change in gradient of a waveform and selecting/inspecting of an optical fiber based on the detection enable an anomaly to be detected or the locations of anomaly points to be measured precisely and an anomaly within the optical fiber is reliably evaluated, as is explained in the case where the value of the gradient is used. In addition, a simultaneous use of the value of the gradient of an OTDR waveform and the amount of change in gradient further enhances a reliable evaluation of an anomaly within an optical fiber.

Alternatively, an optical fiber selecting method according to the present invention is a method for selecting an optical fiber through a use of a waveform of a power of a light beam in the time domain, in which the light beam is measured by inputting a pulsed light beam to an optical fiber to be selected and detecting the light beam returned from the optical fiber, and the method comprises: (1) a zone dividing step to divide the waveform into plural second zones by moving a specific zone width in a specific amount of movement; (2) a gradient calculating step of determining an approximated linear line for the waveform within the second zone and calculating a gradient of the approximated linear line; and (3) a selecting step of selecting the optical fiber based on the result of a determination, the result of the determination being obtained by determining whether or not a value of the calculated gradient is within a specific range.

Furthermore, an optical fiber inspecting system according to the present invention is a system for inspecting an optical fiber through a use of a waveform of a power of a light beam in the time domain, in which the light beam is measured by inputting a pulsed light beam to an optical fiber to be inspected and detecting the light beam returned from the optical fiber, and the system comprises: (1) zone dividing means for dividing the waveform into plural second zones by moving a specific zone width in a specific amount of movement; (2) gradient calculating means for determining an approximated linear line for the waveform within the second zone and calculating a gradient of the approximated linear line; and (3) gradient determining means for determining whether or not a value of the calculated gradient is within a specific range.

In the above-described optical fiber selecting method and inspecting system, the gradient of an OTDR waveform corresponding to a loss in each zone (second zone), which are produced by dividing the optical fiber in its longitudinal direction, is calculated by determining the gradient of an approximated linear line and then an anomaly within the optical fiber is detected depending on whether or not the value of the gradient is within a specific range. In this manner, detecting an anomaly through a use of the value of the gradient of an approximated linear line in each of plural zones and selecting/inspecting an optical fiber based on the detection enable an anomaly to be detected and the range of the anomalies to be measured precisely and an anomaly within the optical fiber to be evaluated reliably.

Alternatively, an optical fiber selecting method according to the present invention is a method for selecting an optical fiber through a use of a waveform of a power of a light beam in the time domain, in which the light beam is measured by inputting a pulsed light beam to an optical fiber to be selected and detecting the light beam returned from the optical fiber, and the method comprises: (1) an approximated linear line calculating step of determining an approximated linear line for the waveform; (2) a deviation waveform calculating step of determining a deviation waveform based on a difference between the waveform and the approximated linear line; (3) a difference value calculating step of determining a first reference value of the maximum or a local maximum of the deviation and a second reference value of the minimum or a local minimum of the deviation for the deviation waveform, and calculating a value of a difference between the first reference value and the second reference value; and (4) a selecting step of selecting the optical fiber based on a result of a determination, the result of the determination being obtained by determining whether or not a value of a difference meets a specific condition.

Furthermore, an optical fiber inspecting system according to the present invention is a system for inspecting an optical fiber through a use of a waveform of a power of a light beam in the time domain, in which the light beam is measured by inputting a pulsed light beam to an optical fiber to be inspected and detecting the light beam returned from the optical fiber, and the system comprises: (1) approximated linear line calculating means for determining an approximated linear line for the waveform; (2) deviation waveform calculating means for determining a deviation waveform based on a difference between the waveform and the approximated linear line; (3) difference value calculating means for determining a first reference value of the maximum or a local maximum of the deviation and a second reference value of the minimum or a local minimum of the deviation for the deviation waveform, and calculating a value of a difference between the first reference value and the second reference value; and (4) difference value determining means for determining whether or not a value of a difference meets a specific condition.

In the above-described optical fiber selecting method and inspecting system, the difference values of deviations of the waveform from an approximated linear line are calculated based on the waveform of deviations between an OTDR waveform and an approximated linear line and then an anomaly within the optical fiber is detected depending on whether or not the value of the difference values meet specific conditions. In this manner, even when an optical fiber is normal in view of a loss in the optical fiber, an anomaly in the optical fiber such as deviation anomalies in a wide range can be reliably evaluated. Particularly, the use of the difference values calculated from the value of the maximum or a local maximum of a deviation and the value of the minimum or a local minimum of a deviation enable the amount of a deviation of waveform from a linear line to be accurately evaluated.

BRIEF DESCRIPTION OF THE DRAWINGS

FIG. 1 is a block diagram illustrating the configuration of a first embodiment of an optical fiber inspecting system according to the present invention;

DETAILED DESCRIPTION OF THE PREFERRED EMBODIMENTS

Figure 2A:
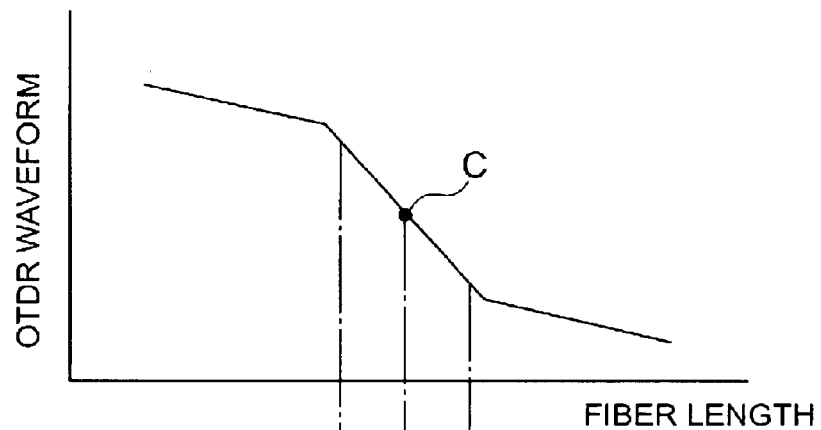
FIGS. 2A and 2B are graphs illustrating an example of (A) an OTDR waveform, and (B) a change of a gradient of the waveform in the time domain.

Preferred embodiments of an optical fiber selecting method and an optical fiber inspecting system according to the present invention will be explained in detail below with reference to the accompanying drawings. The parts and components used in a figure and having the same function as those used in the other figures are denoted by the same numerals and signs as those referred in the other figures, and therefore, repeated explanations are omitted. In addition, the ratio of dimensions for the objects depicted in the figures do not necessarily coincide with the corresponding ratio of dimensions explained in the description of the figures.

Note that a gradient obtained as the primary differentiation of an OTDR waveform corresponds to a local loss at individual locations along the optical fiber or a loss in individual zones divided along the optical fiber. Accordingly, in the following description, regarding a sign of the gradients of the waveform or an approximated linear line, it is assumed that a positive direction corresponds to increase in the gradient and increase in the loss in the optical fiber, and a negative direction corresponds to decrease in the gradient and decrease in the loss in the optical fiber.

FIG. 1 is a block diagram illustrating the configuration of a first embodiment of an optical fiber inspecting system according to the present invention. The optical fiber inspecting system 1A comprises a waveform measuring unit 2 for measuring an OTDR waveform and a waveform evaluating unit 3 for evaluating a measured waveform. Furthermore, the waveform evaluating unit 3 comprises a calculating part 4 for a calculating a data value necessary for an evaluation of the optical fiber and a detecting part 5 for detecting an anomaly within an optical fiber based on the calculated data value. The configuration of the optical fiber inspecting system 1A will be explained together with a manner how the system operates, a method for inspecting an optical fiber and a method for selecting an optical fiber.

First, the waveform measuring unit 2 corresponding to an OTDR measuring system will be explained. The waveform measuring unit 2 includes a pulsed light beam transmitting section 21, an optical coupler 22 and a returned light beam receiving section 23. The pulsed light beam transmitting section 21 includes, for example, a semiconductor laser and produces a pulsed light beam having a specific wavelength and a specific time width used for a measurement of an OTDR waveform, and then, outputs the beam. The pulsed light beam transmitting section 21 is optically coupled via the optical coupler 22 to an optical fiber F to be inspected by the optical fiber inspecting system 1A.

Furthermore, in addition to the pulsed light beam transmitting section 21, the returned light beam receiving section 23 is optically coupled via the optical coupler 22 to the optical fiber F. The returned light beam receiving section 23 includes, for example, a semiconductor light receiving device and detects a light beam with a specific wavelength and input from the optical fiber F, and then, outputs a detection signal.

In the above-described configuration, when a pulsed light beam for inspecting an optical fiber is transmitted from the pulsed light beam transmitting section 21 to the optical fiber F via the optical coupler 22, a returned light beam toward the waveform measuring unit 2 is produced by a backscattering at individual locations along the optical fiber F. The returned light beam is detected via the optical coupler 22 by the returned light beam receiving section 23. Thus, the returned light beam and its power are detected at individual time points after transmission of the pulsed light beam.

The detection signal of the power of the returned light beam and output from the returned light beam receiving section 23 is input to a signal processing section 24 including circuit elements such as an A/D converter necessary for signal processing. The signal processing section 24 processes the detection signal from the returned light beam receiving section 23 in synchronized with a transmission time when the pulsed light beam is transmitted from the pulsed light beam transmitting section 21.

In more detail, the signal processing section 24 containing an A/D converter etc. samples the power of the measured and returned light beam at a number of sampling times with a specific interval, beginning at a sampling start time after passage of a specific time since the transmission time when the pulsed light beam is transmitted from the pulsed light beam transmitting section 21. The obtained sampling data becomes original data indicative of the OTDR waveform that is a waveform of the power of the returned light beam in the time domain.

Note that a time difference between the transmission time when the pulsed light beam is transmitted from the pulsed light beam transmitting section 21 and the sampling time when the returned light beam is received by the returned light beam receiving section 23 and the signal processing section 24 corresponds to the time delay over which optical component of the pulsed light beam transmitted to the optical fiber F is backscattered and then returned to the returned light beam receiving section 23 and the signal processing section 24. That is, the time difference corresponds to a location along the optical fiber F, at which location the measured and returned light beam is backscattered. Accordingly, the OTDR waveform of the power of returned light beam is measured in the time domain and the presence of an anomaly on the waveform is detected, and the time delay corresponding to the location at which the anomaly occurs is measured, and thus, the presence of the anomaly within the optical fiber F to be inspected, the location of a point indicative of the anomaly along the fiber, the range of the anomaly within the fiber, etc., can be evaluated.

The operations of each of the individual sections of the waveform measuring unit 2 are controlled by a measurement controlling section 20. The measurement controlling section 20 indicates to the pulsed light beam transmitting section 21 a transmission time when the pulsed light beam is to be transmitted therefrom. Furthermore, the measurement controlling section 20 refers to the transmission time for the pulsed light beam and indicates to the signal processing section 24 a sampling time when the detection signal from the returned light beam receiving section 23 is to be sampled, which sampling time corresponds to a received time for the returned light beam. Additionally, individual data such as the sampling data for the returned light beam sampled at the signal processing section 24 are collected by the measurement controlling section 20.

Next the waveform evaluating unit 3 corresponding to an OTDR evaluating system (OTDR inspecting system) will be explained below. The waveform evaluating unit 3 of the embodiment comprises a calculating part 4 and a detecting part 5.

The calculating part 4 includes a waveform producing section 40, a gradient calculating section 41 and a gradient change amount calculating section 42. The waveform producing section 40 receives necessary data such as the sampling data indicating the power of a returned light beam collected by the measurement controlling section 20 in the waveform measuring unit 2, and based on those data, produces an OTDR waveform of the power of returned light beam in the time domain. A time delay observed in the waveform in the time domain corresponds to a location along the optical fiber F, as described above.

The gradient calculating section 41 calculates gradients of the OTDR waveform produced by the waveform producing section 40, i.e., the primary differentiation of the waveform, at individual time points (gradient calculating step). Furthermore, the gradient change amount calculating section 42 calculates an amount of change in gradient (an amount of change in the gradients between the individual time points, i.e., the primary differentiation of the gradient) of the OTDR waveform, i.e., the secondary differentiation of the waveform, at the individual time points (gradient change amount calculating step). The values of the gradients and the amounts of change in gradient at the individual time points are used by the detecting part 5 to detect an anomaly within the optical fiber and to inspect/select the optical fiber based on the detection of the anomaly.

The detecting part 5 includes a gradient determining section 51, a gradient change amount determining section 52 and an anomaly detecting section 50.

In the gradient determining section 51, an allowable range (for example, an allowable range of gradient as an allowable range of values) is previously defined to gradients of the OTDR waveform calculated by the gradient calculating section 41. The gradient determining section 51 detects an anomaly within the optical fiber F by determining whether or not the value of the calculated gradient of the waveform is within the allowable range (gradient determining step).

In the gradient change amount determining section 52, an allowable range (for example, an allowable range of amount of change) is previously defined to an amount of change in gradient of the OTDR waveform calculated by the gradient change amount calculating section 42. The gradient change amount determining section 52 detects an anomaly within the optical fiber F by determining whether or not the calculated amount of change in gradient of the waveform is within the allowable range (gradient change amount determining step).

Additionally, the anomaly detecting section 50 detects the presence of the anomaly within the optical fiber F to be inspected and the location of a point indicative of the anomaly along the fiber based on the result of the determination by the gradient determining section 51 and the gradient change amount determining section 52 (anomaly detecting step).

In addition to the inspection of the optical fiber F through a detection of an anomaly, the optical fiber F can be selected by automatic determination or manual determination by an operator. In the above-described selection of the optical fiber F, for example, the optical fiber F is selected such that only an optical fiber having values of the gradients of the waveform within a specific range is selected based on the result of the determination by the gradient determining section 51, the gradient change amount determining section 52 or the anomaly detecting section 50 (selecting step).

Beneficial effects produced by the optical fiber inspecting system, the inspecting method and the selecting method according to the embodiment will be explained below.

In the optical fiber inspecting system shown in FIG. 1 and the optical fiber inspecting/selecting method according to the system, the OTDR waveform is measured by the waveform measuring unit 2 and the gradients of the measured waveform (primary differentiation) corresponding to a local loss at individual locations along the optical fiber F to be inspected is calculated, and then, an anomaly within the optical fiber F is detected by determining whether or not the value of the gradient is within a specific range. As described above, an anomaly is detected by using the values of the gradients of the OTDR waveform and then the optical fiber are inspected and selected based on the detection of the anomaly, thereby enables to the detect accurately the presence and the location of the anomaly.

For example, assume that a method for a detection of an anomaly within an optical fiber through a use of an approximated linear line for a waveform and a cross-point at which the waveform and the approximated linear line cross one another is employed. In this case, even when the waveform itself contains an anomaly, the anomaly cannot be detected in the waveform as long as the correlation between the waveform and the approximated linear line is normal. In contrast, a method for a detection of an anomaly through a direct use of the value of the gradient of a waveform enables to detect accurately and reliably the anomaly within the optical fiber.

Furthermore, in the embodiment, an amount of change in gradient of the OTDR waveform (secondary differentiation), which amount corresponds to a local loss change at individual locations along the optical fiber F to be inspected, is calculated and then, an anomaly within the optical fiber F is detected by determining whether or not the amount of change in gradient is within a specific range. As described above, the anomaly is detected through a use of the amount of change in gradient of an OTDR waveform and subsequently, the optical fiber is inspected and selected based on the detection of the anomaly, thereby enables to detect accurately the presence and the location of the anomaly, which operation is the same as that explained in the description of the case where the value of the gradient of the waveform is used. Additionally, simultaneous usage of the values of the gradients of the OTDR waveform and the amounts of change in gradient thereof enables further to detect reliably an anomaly within an optical fiber. Note that a detailed method for detecting an anomaly within an optical fiber through a use of the gradient and the amount of change in gradient will be described later.

It should be noted that regarding a calculation of gradients of an OTDR waveform in the gradient calculating section 41, it is preferable to divide the waveform into plural zones in the time domain and calculate the gradient by averaging the gradients, calculated within each of the plural zones, for each of the plural zones. That is, since the data of a waveform to be measured takes discontinuous values due to variations in data and noise or the like, it is difficult to determine the values of a differentiation of a waveform simply through formula manipulation over a waveform. Therefore, a gradient of a waveform is calculated, for example, by calculating of numerical difference between adjacent two data points on a waveform.

In more detail, since statistical variations in the sampling data indicating the power of a returned light beam and received by the waveform measuring unit 2 are large, usually, wave form data are produced using numerical smoothing such as a moving average algorithm by the waveform producing section 40. Then, the gradients of the waveform are determined by calculations of numerical difference between adjacent two data points on the waveform. Note that even when using the waveform data processed by the moving average algorithm, the gradients, in some cases, are not calculated with high accuracy because of an influence due to remaining variations in the data.

In such a case, as already described, the waveform data are divided into plural of zones, each zone containing plural data points with a specific time width, and the gradients are averaged over each of the plural zones to determine the gradients within the corresponding zone (for example, the gradients at the start data point within the zone). Thus, the influence due to statistical variations and the like in the waveform data is removed, enabling to detect reliably an anomaly within an optical fiber. Moreover, likewise, also regarding a calculation of the amount of change in gradient of an OTDR waveform in the gradient change amount calculating section 42, preferably, the waveform is divided into plural zones in the time domain and the amounts of change in gradient are averaged over each of the plural zones to determine the amount of change in gradient within the zone.

Note that in order to average the gradients and the amounts of change in gradient over a zone, a variety of average algorithms maybe concretely employed. Alternatively, when variations in the waveform data are sufficiently small, the embodiment may be configured not to employ an averaging operation.

Additionally, regarding a detection of an anomaly within an optical fiber F by the anomaly detecting section 50, although the anomaly maybe detected immediately through the resultant determination by the gradient determining section 51 or the gradient change amount determining section 52, the anomaly may be detected by further employing other methods for the detection of the anomaly together with the current method. For example, for an anomaly point of the optical fiber detected based on the results of the determinations by the gradient determining section 51 and the gradient change amount determining section 52, in addition to evaluate the presence and the location of the anomaly point, the anomaly detecting section 50 may be configured to be able to evaluate the magnitude of the anomaly within the optical fiber at the anomaly point.

Furthermore, when employing the evaluation of the magnitude of the anomaly and detecting the anomaly within the optical fiber through determining whether or not the magnitude of the anomaly is within a specific range, a phenomenon in which minute variations due to noise etc. are erroneously detected as an anomaly point can be prevented. In order to concretely detect the magnitude of the anomaly, for example, a first approximated linear line in a specific zone located before the anomaly point within the optical fiber and a second approximated linear line in a specific zone located after the anomaly point are determined, and a difference between each of those approximated linear lines at the anomaly point is calculated, thereby enabling to detect the magnitude of the anomaly. Moreover, in combination with a determination through a use of the gradient of the waveform or the amount of change in gradient thereof, the detection of the magnitude of the anomaly enables to detect more reliably the anomaly within the optical fiber when previously defining an allowable range (for example, an allowable range of difference as an allowable range of numerical values) for the difference between the approximated linear lines at the anomaly point.

A detailed example of a method for detecting an anomaly within an optical fiber through a use of the gradients of an OTDR waveform will be explained below. Note that an axis of abscissas in each of the following graphs indicates a fiber length (corresponding to locations along the optical fiber F to be inspected). The fiber length corresponds to a time delay equal to a time interval over which the pulsed light beam is transmitted from the pulsed light beam transmitting section 21 and the returned light beam is received by the returned light beam receiving section 23.

Figure 2B:
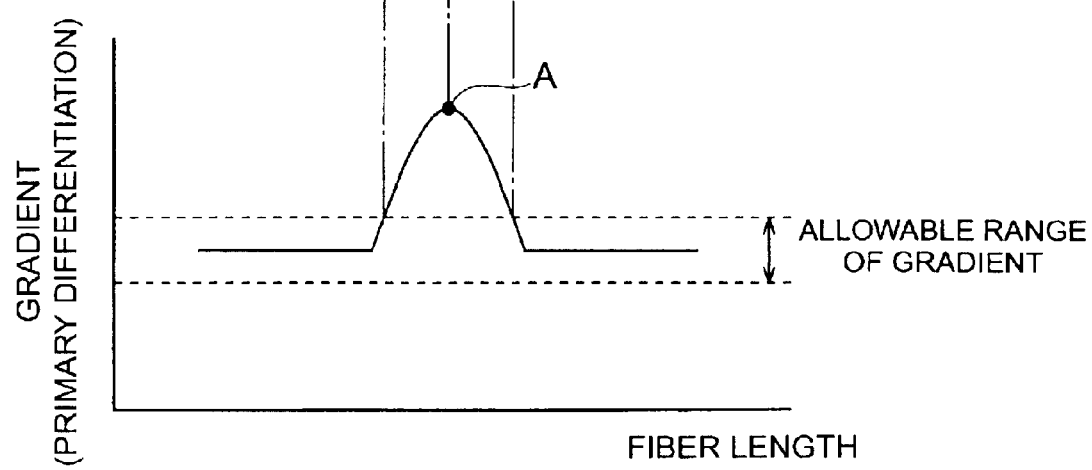

FIGS. 2A and 2B are graphs illustrating an example of (A) an OTDR waveform, and (B) a change in the gradient, i.e., primary differentiation of the waveform, in the time domain. Furthermore, in the graph of the gradient of FIG. 2B, an allowable range of gradient defined for the values of the gradients is also shown.

In the example, as shown in FIG. 2A, the waveform suddenly falls in the vicinity of an anomaly central point C, indicating a falling-step-shaped change in the time domain. In this case, as shown in FIG. 2B, the gradient of the waveform changes one time in a positive direction (in a direction in which the gradient increases). Accordingly, detecting a change in the vicinity of the anomaly point, which change is observed so that the value of the gradient becomes higher than the upper limit of the allowable range of gradient, allows a detection of a falling-step-shaped anomaly within the optical fiber. Furthermore, a point A at which the gradient becomes a local maximum enables the location of the anomaly central point C to be detected within the optical fiber.

Figure 3A:
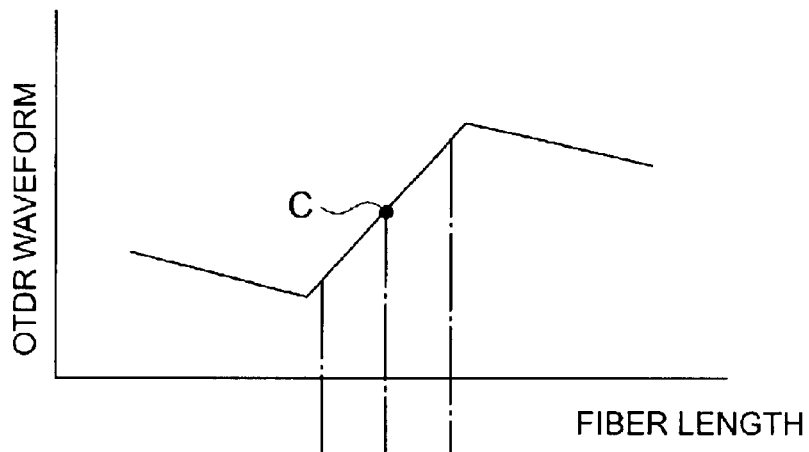
FIGS. 3A and 3B are graphs illustrating another example of (A) an OTDR waveform, and (B) a change of a gradient of the waveform in the time domain.
Figure 3B:
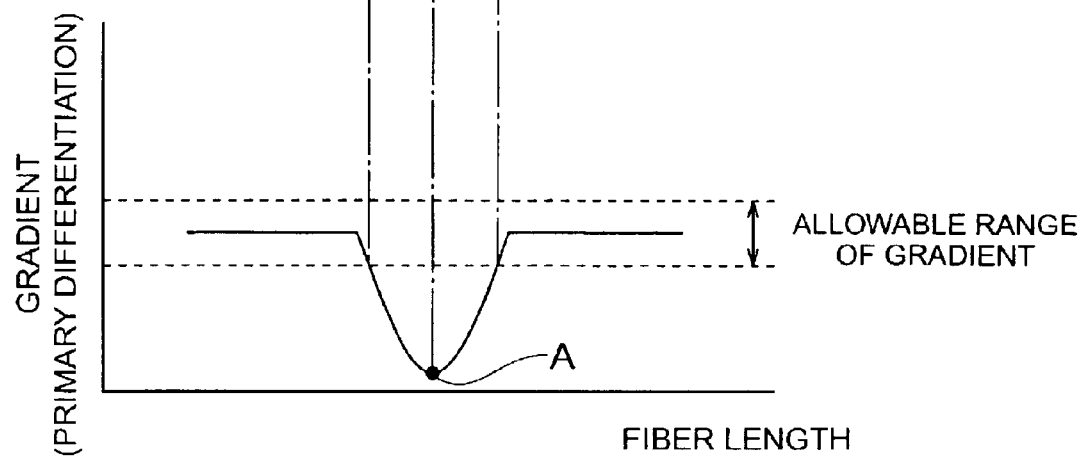

FIGS. 3A and 3B are graphs illustrating another example of (A) an OTDR waveform, and (B) a change in the gradient of the waveform in the time domain.

In the example, as shown in FIG. 3A, the waveform suddenly rises in the vicinity of an anomaly central point C, indicating a rising-step-shaped change in the time domain. In this case, as shown in FIG. 3B, the gradient of the waveform changes one time in a negative direction (in a direction in which the gradient decreases). Accordingly, detecting a change in the vicinity of the anomaly point, which change is observed so that the value of the gradient becomes lower than the lower limit of the allowable range of gradient, allows a detection of a rising-step-shaped anomaly within the optical fiber. Furthermore, a point A at which the gradient becomes a local minimum enables the location of the anomaly central point C to be detected within the optical fiber.

Figure 4A:
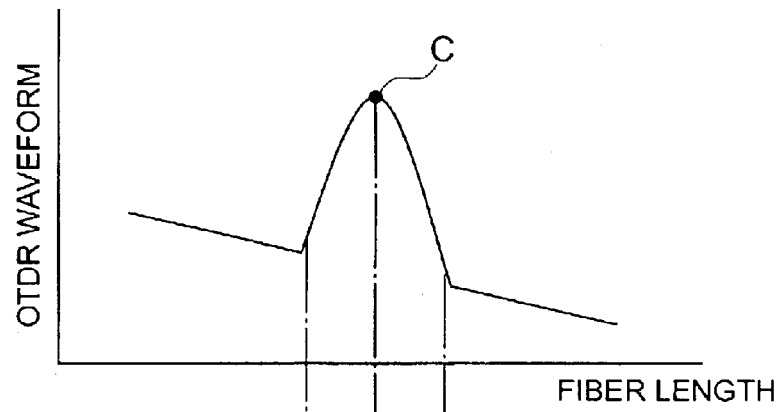
FIGS. 4A and 4B are graphs illustrating another example of (A) an OTDR waveform, and (B) a change of a gradient of the waveform in the time domain.
Figure 4B:
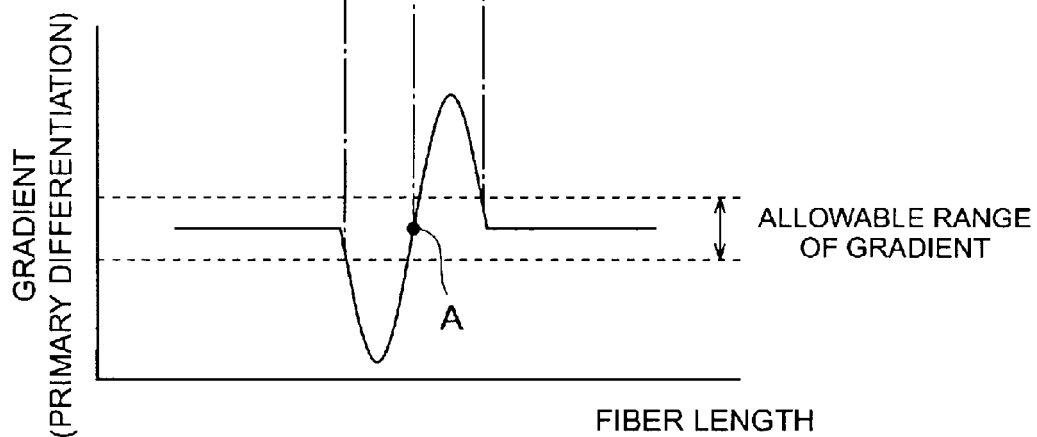

FIGS. 4A and 4B are graphs illustrating another example of (A) an OTDR waveform, and (B) a change in the gradient of the waveform in the time domain.

In the example, as shown in FIG. 4A, the waveform temporarily increases its height in the vicinity of an anomaly central point C, indicating a projection-shaped change in the time domain. In this case, as shown in FIG. 4B, the gradient of the waveform changes two times, i.e., changes in a negative direction and a positive direction, respectively. Accordingly, detecting a change in the vicinity of the anomaly point, which change is observed so that the value of the gradient becomes lower than the lower limit of the allowable range of gradient and then higher than the upper limit thereof, allows a detection of a projection-shaped anomaly within the optical fiber. Furthermore, a point A, which is located between a local minimum and a local maximum of the gradient and at which point a difference between the point A and the mean value of the gradient becomes zero, enables the location of the anomaly central point C to be detected within the optical fiber.

Figure 5A:
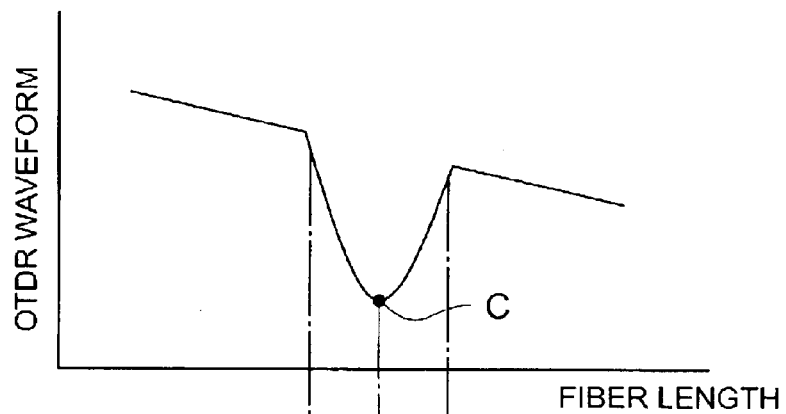
FIGS. 5A and 5B are graphs illustrating another example of (A) an OTDR waveform, and (B) a change of a gradient of the waveform in the time domain.
Figure 5B:
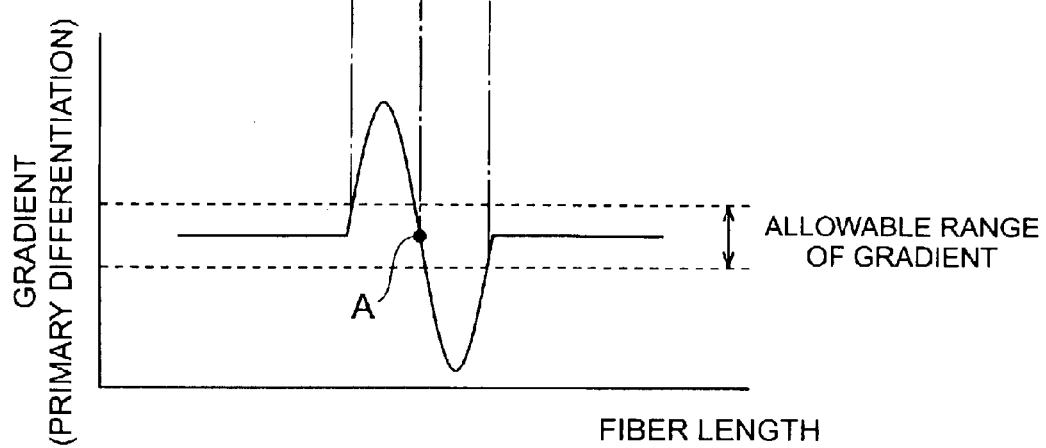

FIGS. 5A and 5B are graphs illustrating another example of (A) an OTDR waveform, and (B) a change in the gradient of the waveform in the time domain.

In the example, as shown in FIG. 5A, the waveform temporarily decreases its height in the vicinity of an anomaly central point C, indicating an inverted-projection-shaped change in the time domain. In this case, as shown in FIG. 5B, the gradient of the waveform changes two times, i.e., changes in a positive direction and a negative direction, respectively. Accordingly, detecting a change in the vicinity of the anomaly point, which change is observed so that the value of the gradient becomes higher than the upper limit of the allowable range of gradient and then lower than the lower limit thereof, enable to detect an inverted-projection-shaped anomaly within the optical fiber. Furthermore, a point A, which is located between a local maximum and a local minimum of the gradient and at which point a difference between the point A and the mean value of the gradient becomes zero, enables the location of the anomaly central point C to be detected within the optical fiber.

As described above, the method in which the allowable range of gradient is defined for the gradient of the OTDR waveform and the anomaly is detected when the value of the gradient becomes outside the allowable range of gradient allows for a reliable detection of the presence of an anomaly within the optical fiber and the location of an anomaly point or an anomaly central point within an optical fiber. In addition, a change in the gradient in the time domain also allows a detection of the type of anomalies, such as a falling-step, a rising-step, a projection and an inverted-projection.

It should be noted that there are several methods for defining an allowable range of gradient for the gradient of a waveform. For example, a method is constructed such that an absolute range of values is defined for the gradient and the range of values is used as an allowable range of gradient. There is an advantage that this kind of method for defining an allowable range of gradient prevents a change in the gradient in the vicinity of an anomaly point from affecting a detection of an anomaly.

Alternatively, a method is constructed such that an approximated linear line is determined for a change in the gradient in the time domain to calculate the mean value of the gradient and an allowable range of gradient is defined with reference to the mean value of the gradient. There is an advantage in this method that a reference value is easily determined for detecting an anomaly and an anomaly within an optical fiber is easily detected by monitoring the change from the mean value.

Alternatively, a method is constructed such that an allowable range of gradient is defined as an allowable range of values with reference to the gradient at a previous data point. There is an advantage that this method prevents a change in the gradient in the vicinity of an anomaly point from affecting a detection of an anomaly and therefore, a local anomaly is easily detected.

Regarding an operation for defining the allowable range of gradient for the gradient of a waveform, it is preferable to employ one of the above-described methods taking the performance of an optical fiber to be inspected and a waveform measurement system into account, or employ a method that appropriately combines the above-described methods. Furthermore, a method other than the above-described methods may be employed in the embodiment.

A detailed example of a method for detecting an anomaly within an optical fiber through a use of the amount of change in gradient of an OTDR waveform will be explained below.

As described above, the use of the gradient of an OTDR waveform enables to detect an anomaly within an optical fiber. Note that the gradient, which is primary differentiation of the waveform, is easily affected by the profile of the waveform that is located near an anomaly point. Accordingly, when a detection of a range of an anomaly along an optical fiber is required, in some cases, a start point and an end point along the anomaly cannot be calculated with sufficient accuracy. In contrast, there is an advantage that the a change point on a waveform, which point is generated by an anomaly, is easy to found by using the amount of change in gradient, which amount is secondary differentiation of the waveform (i.e., primary differentiation of the gradient).

Figure 6A:
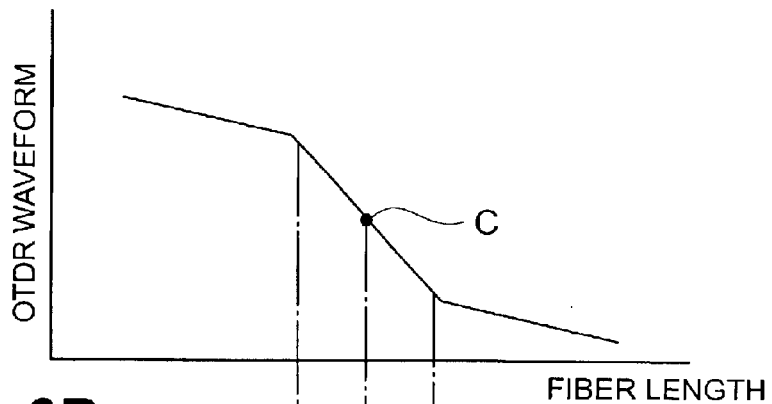
FIGS. 6A and 6B are graphs illustrating an example of (A) an OTDR waveform, and (B) a change of an amount of change in gradient of the waveform in the time domain.
Figure 6B:
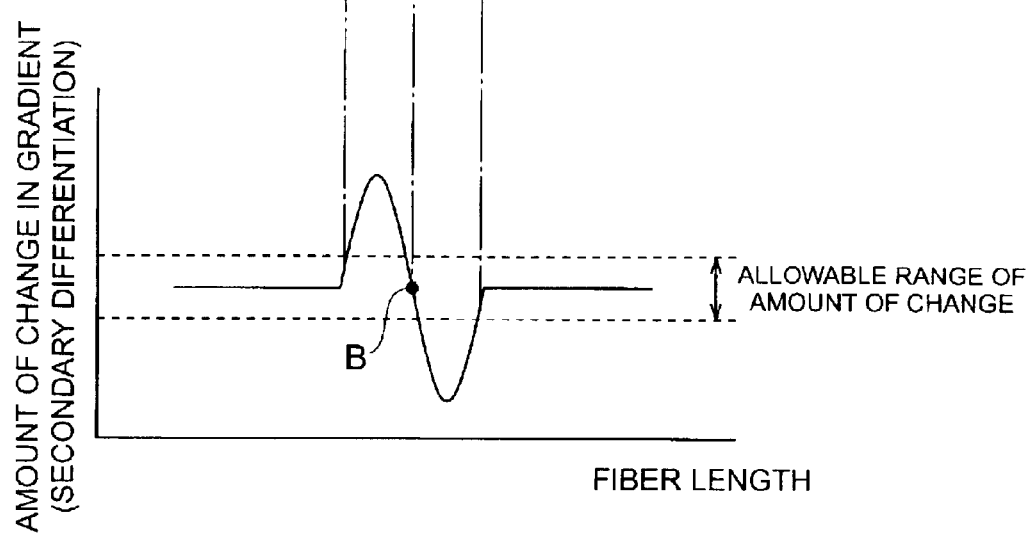

FIGS. 6A and 6B are graphs illustrating an example of (A) an OTDR waveform, and (B) a change of an amount of change in gradient, secondary differentiation of the waveform, in the time domain. Furthermore, in the graph of the amount of change in gradient of FIG. 6B, an allowable range of amount of change defined for the values of the amounts of change in gradient is also shown.

In the example, as shown in FIG. 6A, the waveform suddenly falls in the vicinity of an anomaly central point C, indicating a falling-step-shaped change in the time domain (refer to FIGS. 2A and 2B). In this case, as shown in FIG. 6B, the amount of change in gradient of the waveform changes two times, i.e., changes in a positive direction and a negative direction, respectively. Accordingly, detecting a change in the vicinity of the anomaly point, which change is observed so that the amount of change in gradient becomes higher than the upper limit of the allowable range of amount of change and then lower than the lower limit thereof, enables to detect a falling-step-shaped anomaly within the optical fiber. Furthermore, a point B, which is located between a local maximum and a local minimum of the amount of change in gradient and at which point the amount of change in gradient becomes zero, enables the location of the anomaly central point C to be detected within the optical fiber.

Figure 7A:
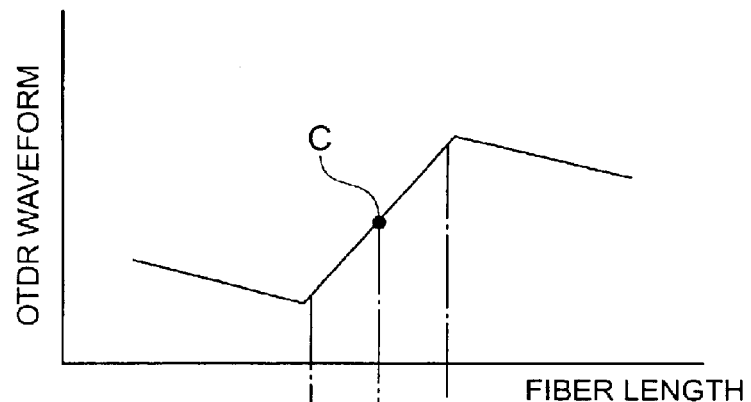
FIGS. 7A and 7B are graphs illustrating another example of (A) an OTDR waveform, and (B) a change of an amount of change in gradient of the waveform in the time domain.
Figure 7B:
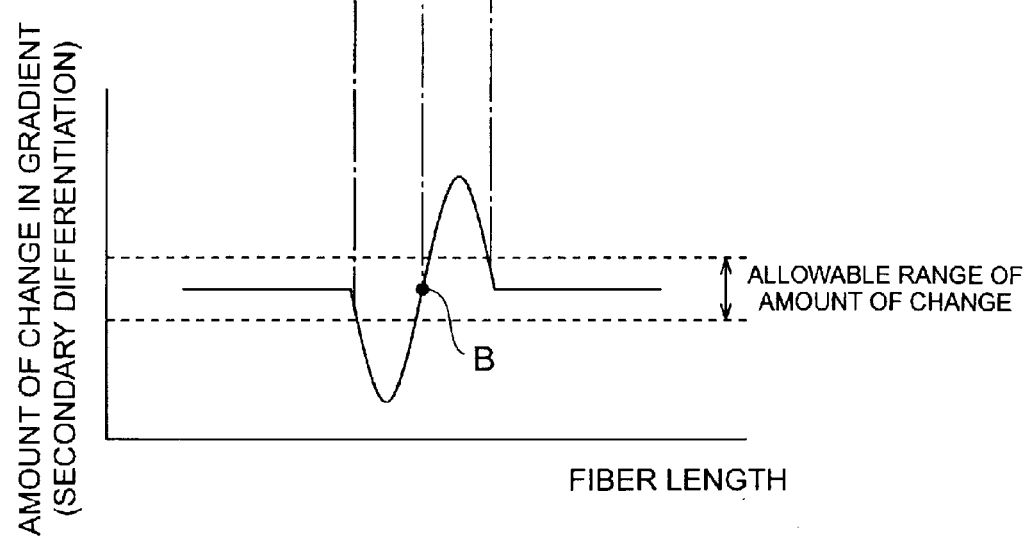

FIGS. 7A and 7B are graphs illustrating another example of (A) an OTDR waveform, (B) a change of an amount of change in gradient of the waveform in the time domain.

In the example, as shown in FIG. 7A, the waveform suddenly rises in the vicinity of an anomaly central point C, indicating a rising-step-shaped change in the time domain (refer to FIGS. 3A and 3B). In this case, as shown in FIG. 7B, the amount of change in gradient of the waveform changes two times, i.e., changes in a negative direction and a positive direction, respectively. Accordingly, detecting a change in the vicinity of the anomaly point, which change is observed so that the amount of change in gradient becomes lower than the lower limit of the allowable range of amount of change and then higher than the upper limit thereof, enables to detect a rising-step-shaped anomaly within the optical fiber. Furthermore, a point B, which is located between a local minimum and a local maximum of the amount of change in gradient and at which point the amount of change in gradient becomes zero, enables the location of the anomaly central point C to be detected within the optical fiber.

Figure 8A:
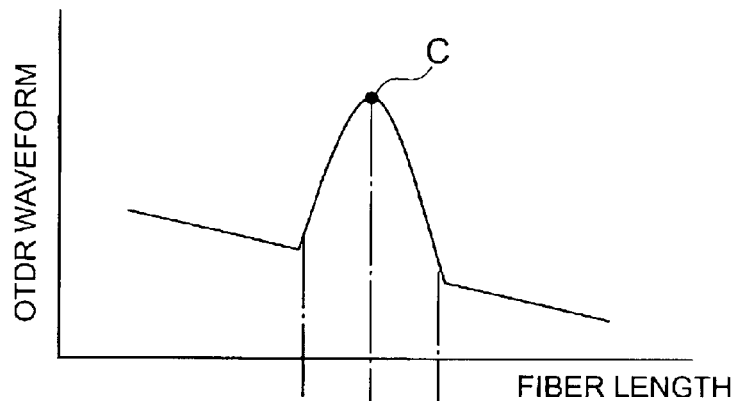
FIGS. 8A and 8B are graphs illustrating another example of (A) an OTDR waveform, and (B) a change of an amount of change in gradient of the waveform in the time domain.
Figure 8B:
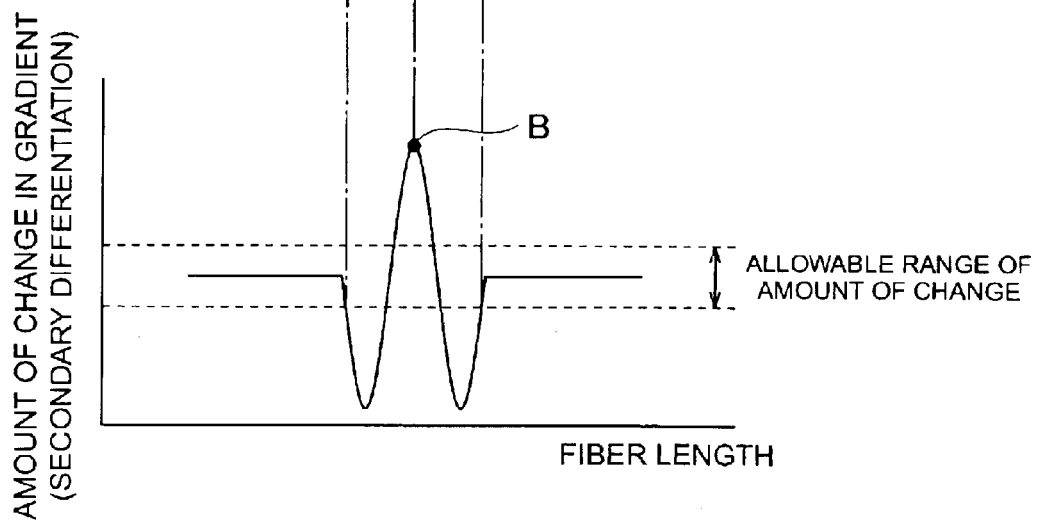

FIGS. 8A and 8B are graphs illustrating another example of (A) an OTDR waveform, and (B) a change of an amount of change in gradient of the waveform in the time domain.

In this example, as shown in FIG. 8A, the waveform temporarily increases its height in the vicinity of an anomaly central point C, indicating a projection-shaped change in the time domain (refer to FIGS. 4A and 4B). In this case, as shown in FIG. 8B, the amount of change in gradient of the waveform changes three times, i.e., changes in a negative direction, a positive direction and a negative direction, respectively. Accordingly, detecting a change in the vicinity of the anomaly point, which change is observed so that the amount of change in gradient becomes lower than the lower limit of the allowable range of amount of change and then higher than the upper limit thereof, and further, lower than the lower limit thereof, enables to detect a projection-shaped anomaly within the optical fiber. Furthermore, a point B, at which the amount of change in gradient becomes a local maximum, enables the location of the anomaly central point C to be detected within the optical fiber.

Figure 9A:
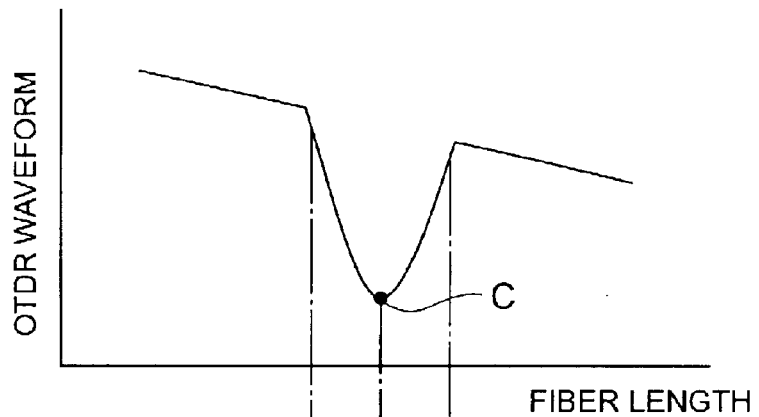
FIGS. 9A and 9B are graphs illustrating another example of (A) an OTDR waveform, and (B) a change of an amount of change in gradient of the waveform in the time domain.
Figure 9B:
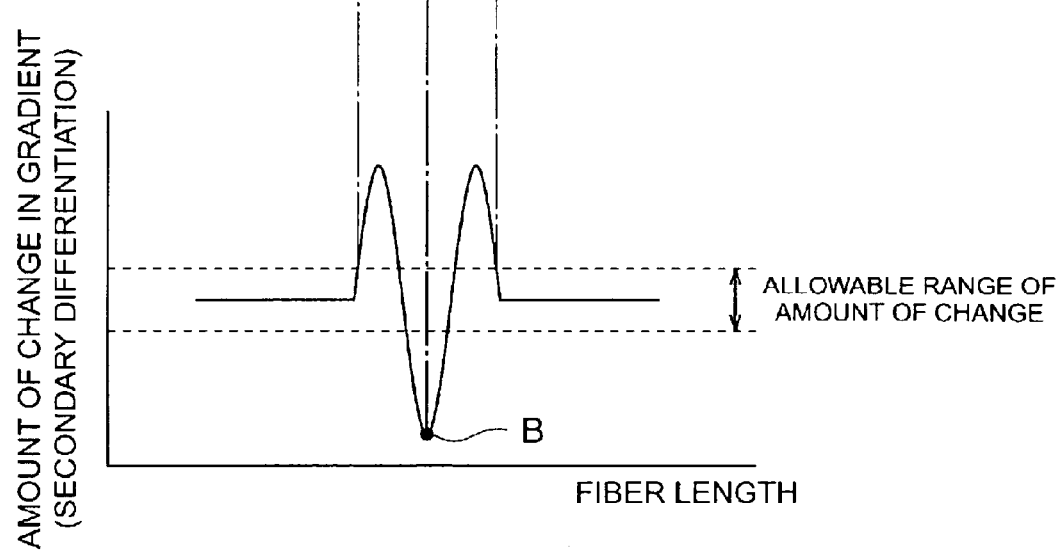

FIGS. 9A and 9B are graphs illustrating another example of (A) an OTDR waveform, and (B) a change of an amount of change in gradient of the waveform in the time domain.

In the example, as shown in FIG. 9A, the waveform temporarily decreases its height in the vicinity of an anomaly central point C, indicating an inversed-projection-shaped change in the time domain (refer to FIGS. 5A and 5B). In this case, as shown in FIG. 9B, the amount of change in gradient of the waveform changes three times, i.e., changes in a positive direction, a negative direction and a positive direction, respectively. Accordingly, detecting a change in the vicinity of the anomaly point, which change is observed so that the amount of change in gradient becomes higher than the upper limit of the allowable range of amount of change and then lower than the lower limit thereof, and further, higher than the upper limit thereof, enables to detect an inversed-projection-shaped anomaly within the optical fiber. Furthermore, a point B, at which the amount of change in gradient becomes a local minimum, enables the location of the anomaly central point C to be detected within the optical fiber.

As described above, the method, in which the allowable range of amount of change is defined for the amount of change in gradient of an OTDR waveform and an anomaly is detected when the value of the amount of change in gradient becomes outside the allowable range of amount of change, allows for a reliable detection of the presence of the anomaly and the location of the anomaly point or an anomaly central point within the optical fiber, as is described in the case where an anomaly is detected through a use of the gradient of an waveform. In addition, a change in the amount of change in gradient in the time domain also enables to detect the type of the anomaly, such as a falling-step, a rising-step, a projection and an inverted-projection.

Furthermore, in the method using the amount of change in gradient of the waveform, the amount of change in gradient, which amount is derived as a secondary differentiation of the waveform, exhibits larger change in its value in comparison with the gradient derived as a primary differentiation of the waveform and therefore, changes in a start point and an end point of the anomaly range are sharp. This enables an accurate determination of a start point and an end point in a range of the anomaly. Note that the amount of change in gradient is easily affected by minute variations in the profile of the waveform due to noise etc., and therefore, when influence of noise etc., becomes serious in detecting an anomaly, it is preferable to employ a method using the gradient and a method using the amount of change in gradient together. Alternatively, when one of a method using the gradient and a method using the amount of change in gradient enables to detect sufficient accurately an anomaly, only one of those methods maybe employed for detecting an anomaly.

Note that when employing the above-described method using the gradient of the OTDR waveform or the amount of change in the gradient of the waveform for a detection of an anomaly within an optical fiber, in some cases, sudden variations in the gradient or in the amount of change in gradient, which variations are due to minute variations such as noise, are detected and the minute variations are erroneously detected as an anomaly. In order to prevent such an erroneous detection of an anomaly, a numerical difference between approximated linear lines located before and after an anomaly point is determined in addition to an evaluation of the gradient of the waveform etc., and thus, an evaluation of the magnitude of the anomaly at the anomaly point becomes possible. Furthermore, when using the evaluation of the magnitude of the anomaly, a phenomenon in which minute variations are erroneously detected as an anomaly can be prevented.

Figure 10A:
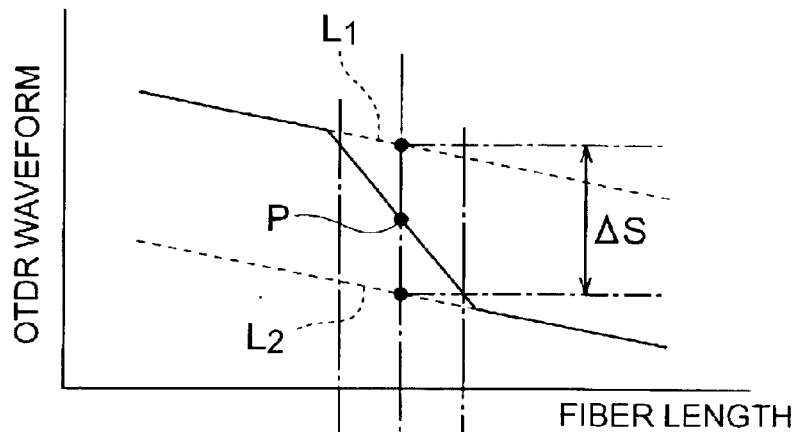
FIGS. 10A to 10C are graphs illustrating an example of (A) an OTDR waveform, (B) a change of a gradient of the waveform, and (C) a change of an amount of change in gradient of the waveform in the time domain.
Figure 10B:
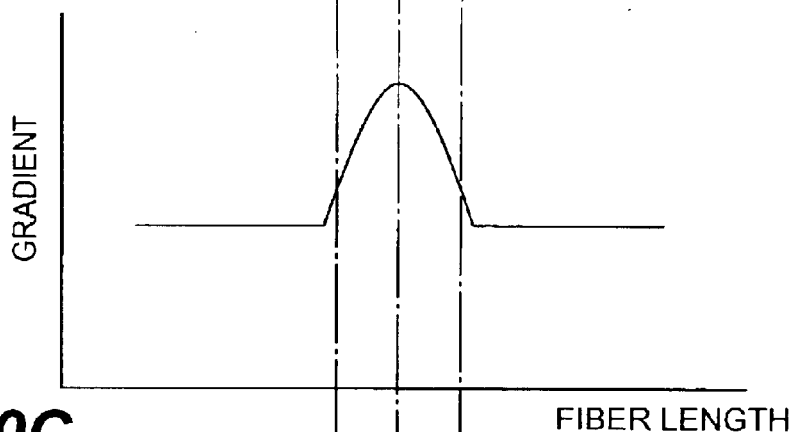
Figure 10C:
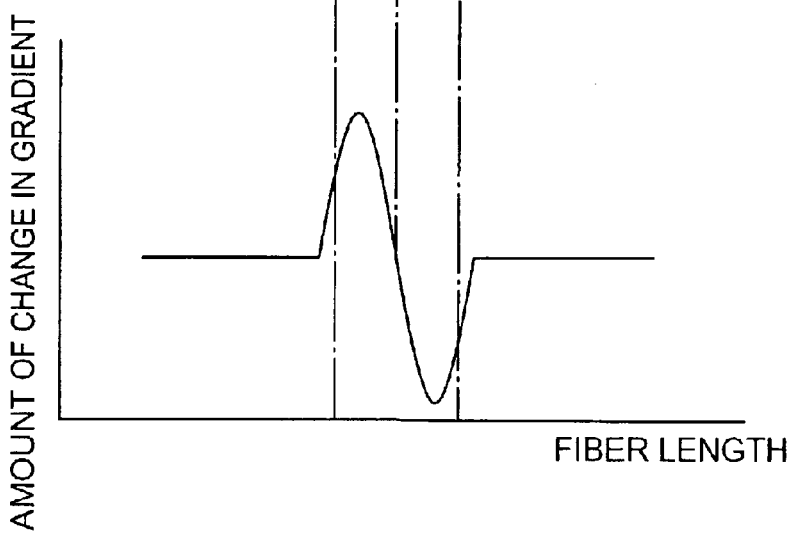

FIGS. 10A to 10C are graphs illustrating an example of (A) an OTDR waveform, (B) a change of a gradient of the waveform, and (C) a change of an amount of change in gradient of the waveform in the time domain.

In the example, as shown in FIG. 10A, the waveform suddenly falls in the vicinity of an anomaly central point, indicating a falling-step-shaped change in the time domain (refer to FIGS. 2A and 2B, and FIGS. 6A and 6B). When the anomaly in change in the time domain is detected using the gradient, i.e., a primary differentiation of the waveform, first, a central point in a detected anomaly range is determined as an anomaly point P for an evaluation of the magnitude of the anomaly.

For this anomaly point P, a first approximated linear line $L_1$ is determined for a waveform within a specific zone (e.g., a zone in which the gradient of the waveform is constant) located before a start point of the detected anomaly range. Similarly, a second approximated linear line $L_2$ is determined for a waveform within a specific zone located after an end point of the anomaly range. Thereafter, as shown in FIG. 10A, a numerical difference $\Delta s$ between the value of the first approximated linear line $L_1$ and the value of the second approximated linear line $L_2$ at the anomaly point P is determined.

The difference $\Delta s$ enables to evaluate the magnitude of a falling-step-shaped anomaly at the anomaly point P. In addition, determining whether or not the difference $\Delta s$ is within a previously defined allowable range of difference enables determination of whether or not an anomaly within the optical fiber is a minute falling-step-shaped change. Note that also when an anomaly is detected through a use of the amount of change in gradient, i.e., a secondary differentiation of the waveform, a method similar to the above-described procedure enables to evaluate of the magnitude of an anomaly.

Figure 11A:
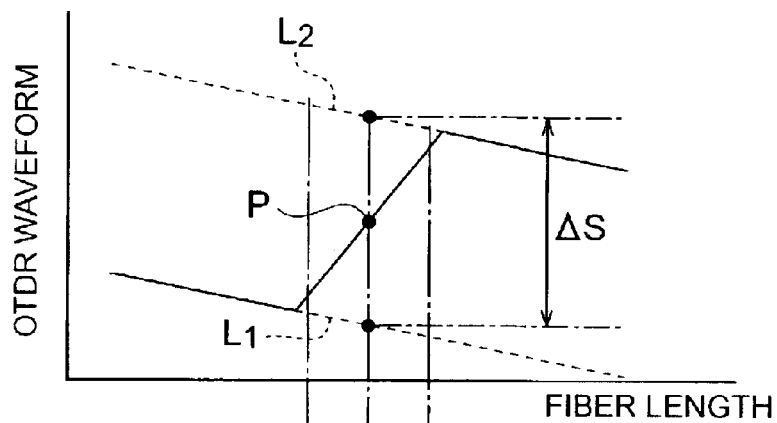
FIGS. 11A to 11C are graphs illustrating another example of (A) an OTDR waveform, (B) a change of a gradient of the waveform, and (C) a change of an amount of change in gradient of the waveform in the time domain.
Figure 11B:
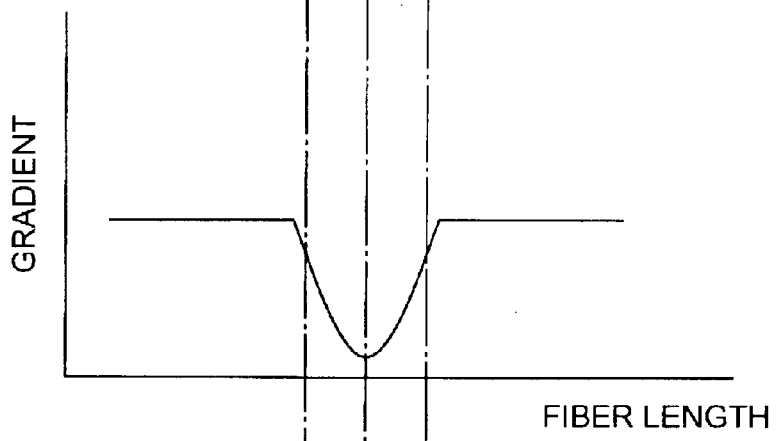
Figure 11C:
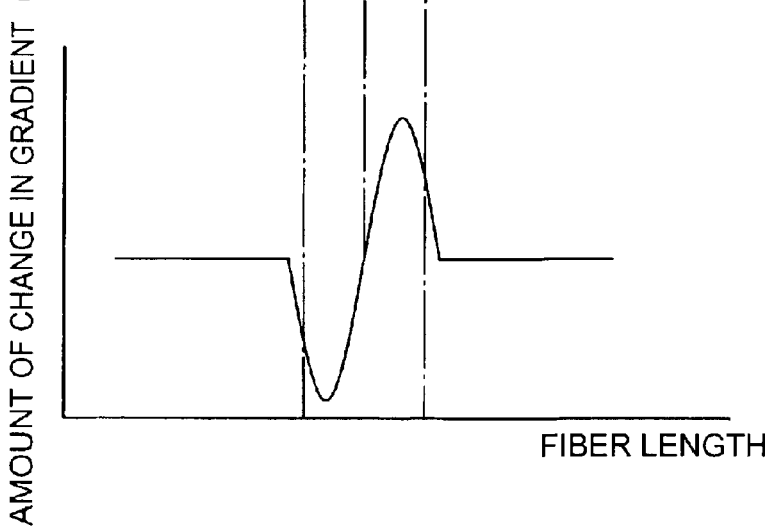

FIGS. 11A to 11C are graphs illustrating another example of (A) an OTDR waveform, (B) a change of a gradient of the waveform, and (C) a change of an amount of change in gradient of the waveform in the time domain.

In the example, as shown in FIG. 11A, the waveform suddenly rises in the vicinity of an anomaly central point, indicating a rising-step-shaped change in the time domain (refer to FIGS. 3A and 3B, and FIGS. 7A and 7B). When an anomaly in change in the time domain is detected using the gradient of the waveform, first, a central point in a detected anomaly range is determined as an anomaly point P for evaluating the magnitude of the anomaly.

For this anomaly point P, a first approximated linear line $L_1$ is determined for a waveform within a specific zone located before a start point of the detected anomaly range. Similarly, a second approximated linear line $L_2$ is determined for a waveform within a specific zone located after an end point of the anomaly range. Thereafter, as shown in FIG. 11A, a numerical difference $\Delta s$ between the value of the first approximated linear line $L_1$ and the value of the second approximated linear line $L_2$ at the anomaly point P is determined.

The difference $\Delta s$ enables to evaluate the magnitude of a rising-step-shaped anomaly at the anomaly point P. In addition, determining whether or not the difference $\Delta s$ is within a previously defined allowable range of difference enables to determine whether or not an anomaly within an optical fiber is a minute rising-step-shaped change. Note that also when an anomaly is detected through a use of the amount of change in gradient of the waveform, a method similar to the above-described procedure enables to evaluate the magnitude of the anomaly.

Figure 12A:
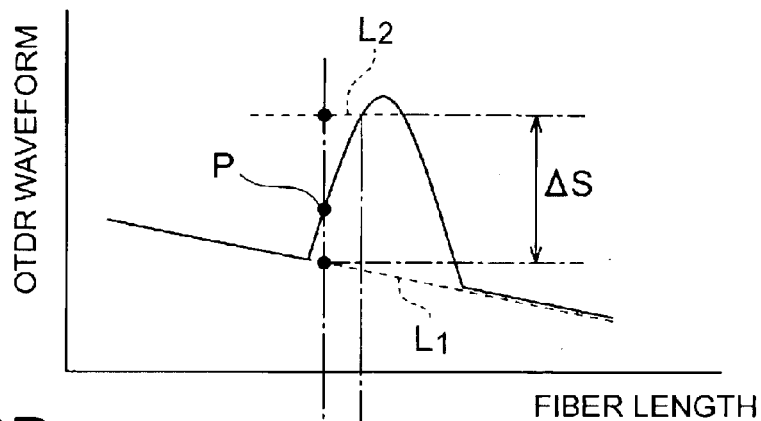
FIGS. 12A to 12C are graphs illustrating another example of (A) an OTDR waveform, (B) a change of a gradient of the waveform, and (C) a change of an amount of change in gradient of the waveform in the time domain.
Figure 12B:
Figure 12C:
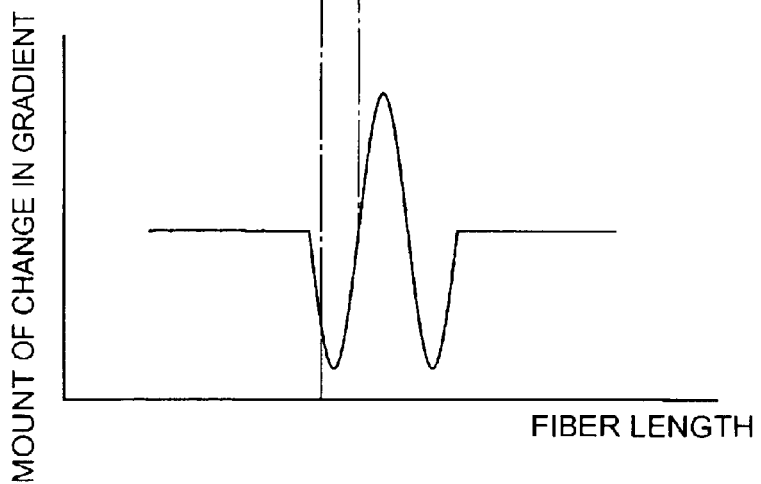

FIGS. 12A to 12C are graphs illustrating another example of (A) an OTDR waveform, (B) a change of a gradient of the waveform, and (C) a change of an amount of change in gradient of the waveform in the time domain.

In the example, as shown in FIG. 12A, the waveform temporarily increases its height in the vicinity of an anomaly central point, indicating a projection-shaped change in the time domain (refer to FIGS. 4A and 4B, and FIGS. 8A and 8B). When an anomaly in change in the time domain is detected using the gradient of the waveform, first, a start point in a detected anomaly range is determined as an anomaly point P for an evaluation of the magnitude of the anomaly.

For this anomaly point P, a first approximated linear line $L_1$ is determined for the waveform within a specific zone located before a start point (anomaly point P) of the detected anomaly range. Similarly, a second approximated linear line $L_2$ is determined for the waveform within a specific zone that contains the central point of the anomaly range. Thereafter, as shown in FIG. 12A, a numerical difference $\Delta s$ between the value of the first approximated linear line $L_1$ and the value of the second approximated linear line $L_2$ at the anomaly point P is determined.

The difference $\Delta s$ enables to evaluate the magnitude of a projection-shaped anomaly at the anomaly point P. In addition, determining whether or not the difference $\Delta s$ is within a previously defined allowable range of difference enables to determine whether or not the anomaly within the optical fiber is a minute projection-shaped change. Note that also when an anomaly is detected through a use of the amount of change in gradient of the waveform, a method similar to the above-described procedure enables to evaluate the magnitude of the anomaly.

Figure 13A:
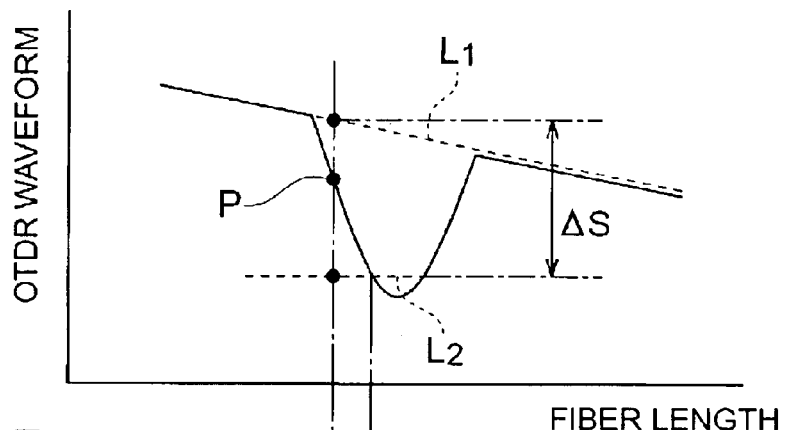
FIGS. 13A to 13C are graphs illustrating another example of (A) an OTDR waveform, (B) a change of a gradient of the waveform, and (C) a change of an amount of change in gradient of the waveform in the time domain.
Figure 13B:
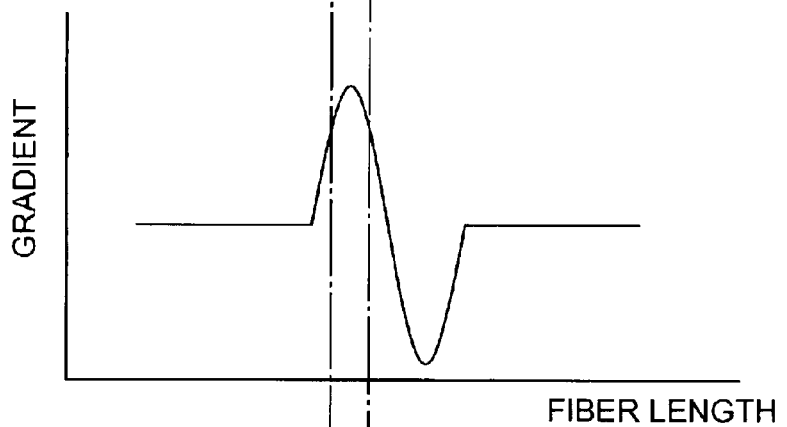
Figure 13C:
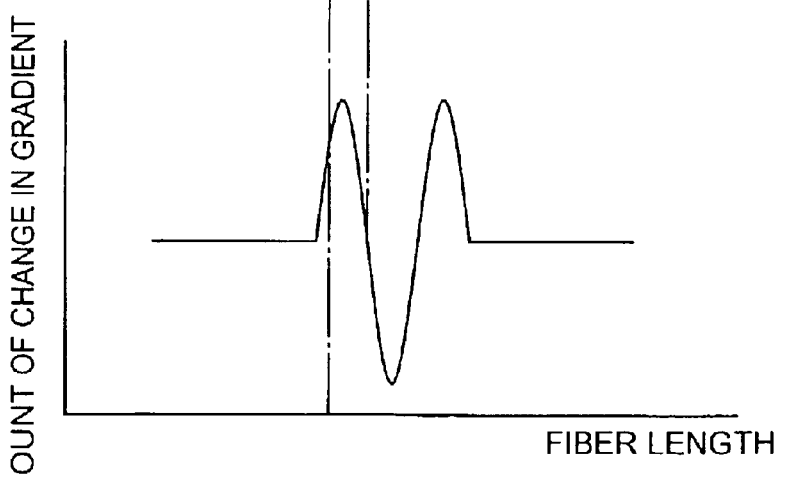

FIGS. 13A to 13C are graphs illustrating another example of (A) an OTDR waveform, (B) a change of a gradient of the waveform, and (C) a change of an amount of change in gradient of the waveform in the time domain.

In the example, as shown in FIG. 13A, the waveform temporarily decreases its height in the vicinity of an anomaly central point, indicating an inversed-projection-shaped change in the time domain (refer to FIGS. 5A and 5B, and FIGS. 9A and 9B). When an anomaly in change in the time domain is detected using the gradient of the waveform, first, a start point of a detected anomaly range is determined as an anomaly point P for evaluating the magnitude of the anomaly.

For this anomaly point P, a first approximated linear line $L_1$ is determined for a waveform within a specific zone located before a start point (anomaly point P) of the detected anomaly range. Similarly, a second approximated linear line $L_2$ is determined for a waveform within a specific zone that contains the central point of the anomaly range. Thereafter, as shown in FIG. 13A, a numerical difference Δs between the value of the first approximated linear line $L_1$ and the value of the second approximated linear line $L_2$ at the anomaly point P is determined.

The difference Δs enables to evaluate the magnitude of an inversed-projection-shaped anomaly at the anomaly point P. In addition, determining whether or not the difference Δs is within a previously defined allowable range of difference enables to determine whether or not an anomaly within an optical fiber is a minute inversed-projection-shaped change. Note that also when an anomaly is detected through a use of the amount of change in gradient of the waveform, a method similar to the above-described procedure enables to evaluate the magnitude of the anomaly.

As described above, in combination with a method using the gradient of the waveform or the amount of change in gradient of the waveform, a method, in which the magnitude of an anomaly is detected using a difference between two approximated linear lines before and after an anomaly point, and when the value of difference is outside an allowable range of difference, the anomaly is detected, enables to remove minute change due to noise etc., and allows for a reliable detection of the presence etc., of an anomaly within an optical fiber. Note that an anomaly point in a detected anomaly range, and two approximated linear lines for the anomaly point may be determined using a variety of methods other than the above-described methods or procedures.

Figure 14:
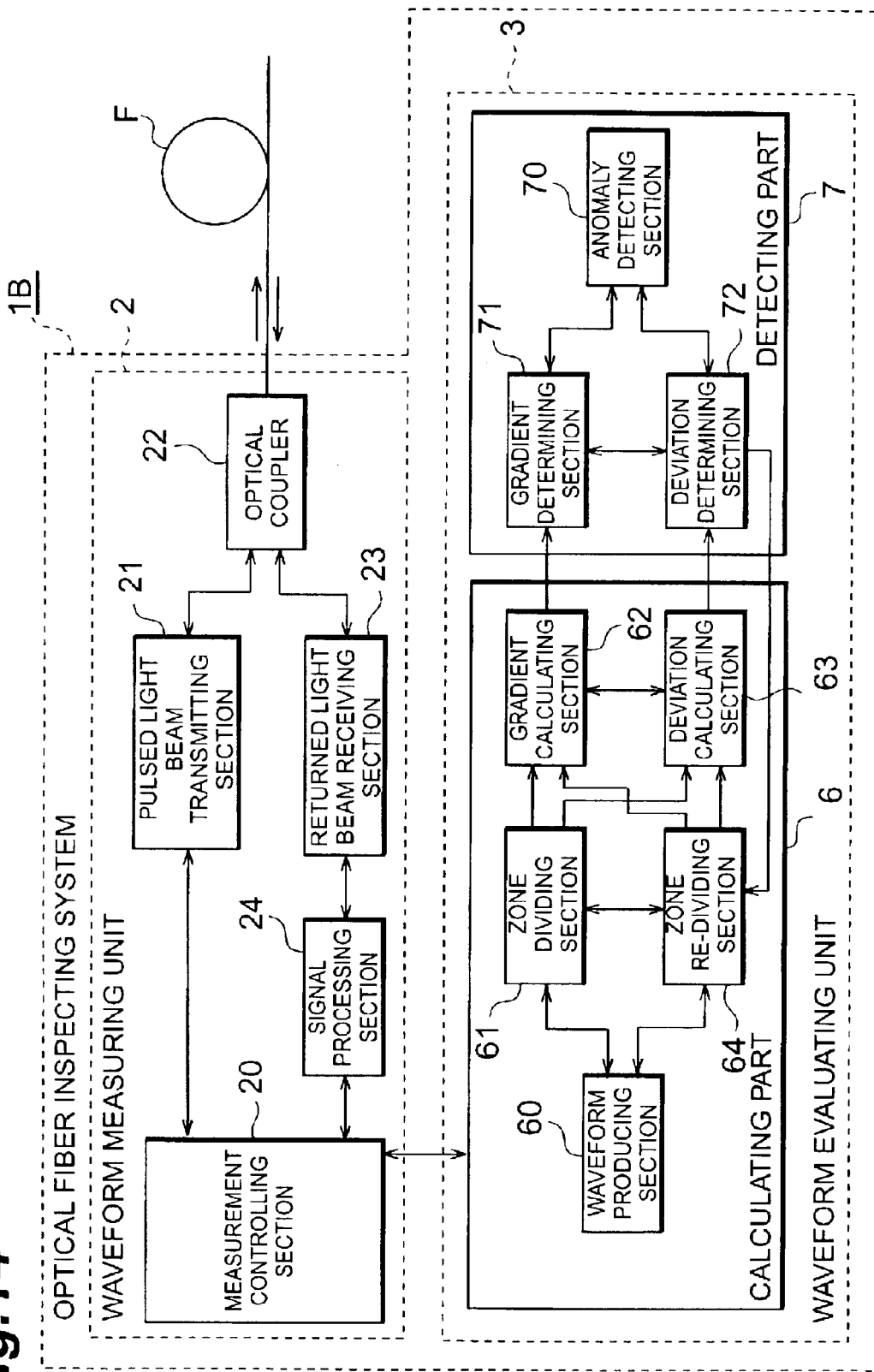
FIG. 14 is a block diagram illustrating the configuration of a second embodiment of an optical fiber inspecting system according to the present invention.

FIG. 14 is a block diagram illustrating the configuration of a second embodiment of an optical fiber inspecting system according to the present invention. The optical fiber inspecting system 1B comprises a waveform measuring unit 2 for measuring an OTDR waveform and a waveform evaluating unit 3 for evaluating a measured waveform. Furthermore, the waveform evaluating unit 3 comprises a calculating part 6 for calculating a data value necessary for evaluation of an optical fiber and a detecting part 7 for a detection of an anomaly within an optical fiber through a use of the calculated data value. In this embodiment, the configuration of the waveform measuring unit 2 is the same as that of the corresponding unit of the first embodiment.

The waveform evaluating unit 3 corresponding to an OTDR evaluating system (OTDR inspecting system) will be explained below. The waveform evaluating unit 3 of the embodiment comprises the calculating part 6 and the detecting part 7.

The calculating part 6 includes a waveform producing section 60, a zone dividing section 61, a gradient calculating section 62, a deviation calculating section 63 and a zone re-dividing section 64. The waveform producing section 60 receives necessary data such as the sampling data indicating the power of a returned light beam and collected by the measurement controlling section 20 of the waveform measuring unit 2, and based on those data, produces an OTDR waveform of the power of a returned light beam in the time domain. A time delay observed in the waveform in the time domain corresponds to the location along the optical fiber F as described above. Note that when statistical variations in the sampling data indicating the power of a returned light beam and acquired by the waveform measuring unit 2 are large, the data indicative of a waveform is processed using numerical smoothing such as a moving average algorithm by the waveform producing section 60.

The zone dividing section 61 divides the OTDR waveform produced by the waveform producing section 60 into plural zones (second zones), each having a specific zone width (zone dividing step). That is, the specific zone width is moved in a specific amount of movement for a waveform, dividing the waveform into plural second zones.

The gradient calculating section 62 determines an approximated linear line corresponding to the waveform within a zone, which is produced by dividing the waveform, and calculates the gradient of the approximated linear line as a gradient of waveform within the zone (gradient calculating step). The value of the gradient of the approximated linear line within each zone is used by the detecting part 7 for detecting an anomaly within the optical fiber and inspecting/selecting the optical fiber based on the detection.

Furthermore, the deviation calculating section 63 calculates a deviation between the waveform within a zone and the approximated linear line, determined for the waveform within a zone by the gradient calculating section 62, for each of the divided plural zones (deviation calculating step). The deviation between the waveform and the corresponding approximated linear line within each zone is used by the detecting part 7 for determination of whether or not the waveform is to be re-divided.

The detecting part 7 comprises a gradient determining section 71, a deviation determining section 72 and an anomaly detecting section 70.

In the gradient determining section 71, an allowable range (for example, an allowable range of gradient as an allowable range of numerical values) is previously defined for the gradient of an approximated linear line corresponding to the OTDR waveform, which gradients are calculated for each zone by the gradient calculating section 62. The gradient determining section 71 determines whether or not the value of the calculated gradient of the waveform is within a specific range and then detects an anomaly within an optical fiber (gradient determining step).

Furthermore, the anomaly detecting section 70 detects the presence of an anomaly within the optical fiber F to be inspected and the range, in which an anomaly exists, based on the result of the determination by the gradient determining section 71, etc. (anomaly detecting step).

In addition to the inspection of the optical fiber F through a detection of an anomaly, the optical fiber F can be selected by an automatic or manual determination by an operator. In the above-stated selection of the optical fiber F, for example, the optical fiber F is selected such that only an optical fiber having a value of the gradient of the waveform within a specific range is selected based on the result of the determination by the gradient determining section 71 or the anomaly detecting section 70 (selecting step).

Additionally, in the deviation determining section 72, an allowable range (for example, an allowable range of deviation as an allowable range of numerical values) is previously defined for the deviation of the OTDR waveform, which deviation is calculated for each zone by the deviation calculating section 63. The deviation determining section 72 determines whether or not the value of the calculated deviation between the waveform and the approximated linear line is within a specific range, detecting an anomaly within an optical fiber F based on the result of the determination (deviation determining step).

When the value of deviation is outside the specific range, the deviation determining section 72 sends to the zone re-dividing section 64 a directive signal indicating that the zone re-dividing section 64 of the calculating part 6 should re-divide a waveform. The zone re-dividing section 64 divides the waveform within a certain zone, for which zone the value of deviation is determined as being outside the specific range, into plural zones (third zones) (zone re-dividing step). Then, the following operation is repeated for each of the plural zones produced by the above-described re-dividing operation: the gradient calculating section 62 and the deviation calculating section 63 calculate a gradient and a deviation, respectively; and the gradient determining section 71 and the deviation determining section 72 determines whether or not the gradient and the deviation each are within the respective allowable range in order to detect an anomaly within an optical fiber. Note that operation for re-dividing a waveform into plural third zones is preferably performed for a zone, from which zone the value of deviation is determined as being outside the specific range.

Beneficial effects produced by the optical fiber inspecting system, the inspecting method and the selecting method according to the embodiment will be explained below.

In the optical fiber inspecting system shown in FIG. 14 and the optical fiber inspecting/selecting methods using the system, an OTDR waveform is measured by the waveform measuring unit 2 and the gradient of OTDR waveform, which gradient corresponds to a loss in each zone (second zone) that is produced by dividing an optical fiber F to be inspected into plural zones in a longitudinal direction, is calculated based on the gradient of an approximated linear line in the each zone, and then, an anomaly within the optical fiber F is detected depending on whether or not the value of the gradient is within a specific range. In this manner, a detection of an anomaly though a use of the gradient of an approximated linear line in each of the plural zones and inspection/selection of an optical fiber made based on the result of the determination enables to detect accurately the presence of an anomaly and the range, in which an anomaly exists.

For example, when employing a method for a detection of an anomaly within an optical fiber through a use of an approximated linear line corresponding to an entire waveform and a point at which the waveform and the approximated linear line corresponding to an entire waveform cross each other, as long as the correlation between the waveform and the approximated linear line corresponding to an entire waveform is normal, an anomaly cannot be detected within an optical fiber even in a case where the waveform itself contains an anomaly. In contrast, when employing a method for dividing a waveform into plural zones and determining an approximated linear line for each zone, and then, detecting an anomaly using the value of the gradient of the line, an anomaly within an optical fiber can reliably be detected. Note that a detailed method for a detection of an anomaly within an optical fiber through a use of a gradient in each zone will be described later.

Furthermore, in the embodiment, in addition to the gradient of an approximated linear line in each zone, which zone is produced by dividing the OTDR waveform into plural zones, is determined, a deviation between a waveform and an approximated linear line in each zone is calculated, and then, execution of operation for re-dividing the optical fiber F into plural zones and repeatedly detecting an anomaly in each of the plural zones is determined depending on whether or not the value of the deviation is within a specific range. This enables a reliable detection of an anomaly existing within a zone width, which width is produced when a waveform is divided. Note that regarding a calculation of deviation and subsequent determination, based on the deviation, of execution of a re-dividing operation, the method of the invention may be configured not to include the calculation of deviation, if unnecessary, depending on how the zone dividing section 61 determines a zone width when dividing a waveform into plural zones.

It should be noted that regarding a determination of an approximated linear line corresponding to an OTDR waveform and a calculation of a gradient by the gradient calculating section 62, it is preferable to determine the approximated linear line by applying a least-square method to the waveform within a zone. This enables an accurate calculation of an approximated linear line and the gradient of the line in each zone. Furthermore, a linear approximation method other than a least-square method may be employed.

A detailed example of a method for a detection of an anomaly within an optical fiber through a use of the gradient of an approximated linear line in each zone, which zone is produced by dividing an OTDR waveform, will be explained below. Note that an axis of abscissas in each of the following graphs indicates a length (corresponding to locations along the optical fiber F to be inspected) of fiber. The fiber length corresponds to a time delay equal to a time interval over which the pulsed light beam is transmitted from the pulsed light beam transmitting section 21 and the returned light beam is received by the returned light beam receiving section 23.

Figure 15A:
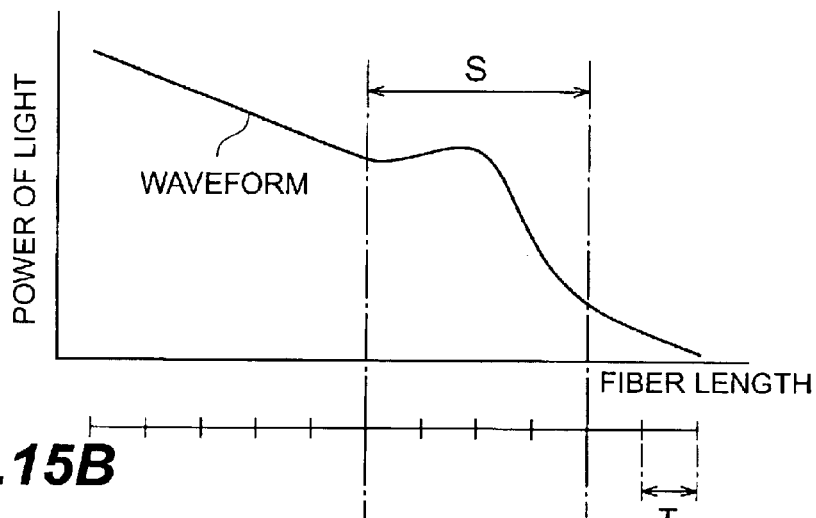
FIGS. 15A to 15C are graphs illustrating an example of (A) an OTDR waveform, (B) an approximated waveform, and (C) a change of a gradient of an approximated linear line in each zone in the time domain.
Figure 15B:
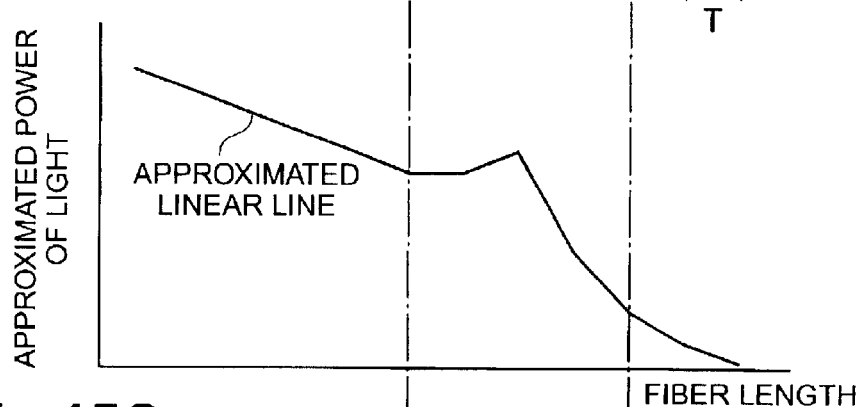
Figure 15C:
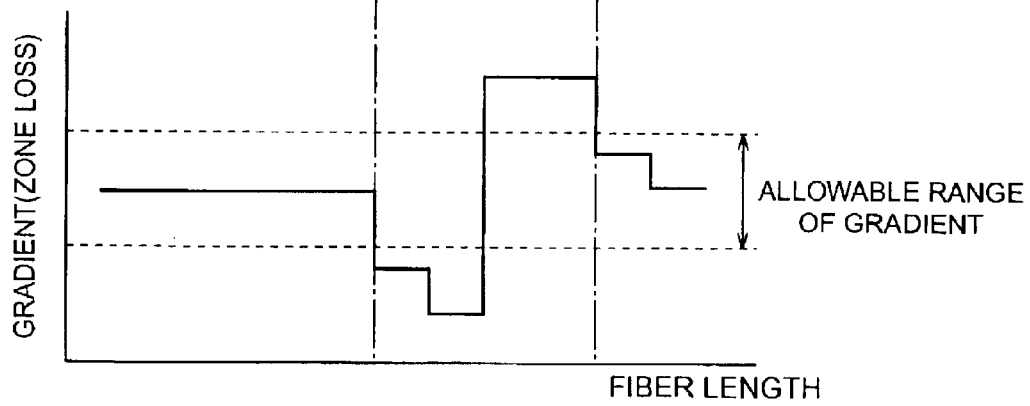

FIGS. 15A to 15C are graphs illustrating an example of (A) an OTDR waveform, (B) an approximated waveform drawn using approximated linear lines, and (C) a change of gradients of approximated linear lines, which change corresponds to a zone loss in each zone, in the time domain.

In the example, as shown in FIG. 15A, a zone anomaly representing a wide and swell-shaped anomaly occurs in a zone S, a part of an optical fiber. The OTDR waveform thus depicted are divided into plural zones of a specific zone width T (in FIGS. 15A to 15C, eleven zones are depicted). Then, a least-square method is applied to waveform data within a zone, which is produced by the dividing operation, to determine an approximated linear line and then the gradient of the approximated linear line corresponding to a zone loss is calculated. Furthermore, a determination of the approximated linear line and calculation of the gradient of the line are sequentially made for each zone and an anomaly within an optical fiber is detected depending on whether or not the value of gradient calculated for each zone is within an allowable range of gradient.

FIG. 15B is a graph illustrating an approximated waveform drawn using the approximated linear line, which line is determined for a waveform in each zone, and FIG. 15C is a graph illustrating the gradient of the approximated linear line in each zone. Furthermore, the graph of FIG. 15C illustrates an allowable range of gradient as an allowable range of numerical values, which range is defined for the gradient of the approximated linear line. In the example, a zone S, in which a zone anomaly exists, is divided into four zones and the values of the gradient of the approximated linear lines for each of the four zones are outside the allowable range of gradient. This allows a detection of a swell-shaped anomaly in the zone S of an optical fiber.

It should be appreciated that a zone producing method for dividing an OTDR waveform into plural zones, which method is employed for the above-described detection of an anomaly within an optical fiber, is typified by a step method and a slide method.

Figure 16:
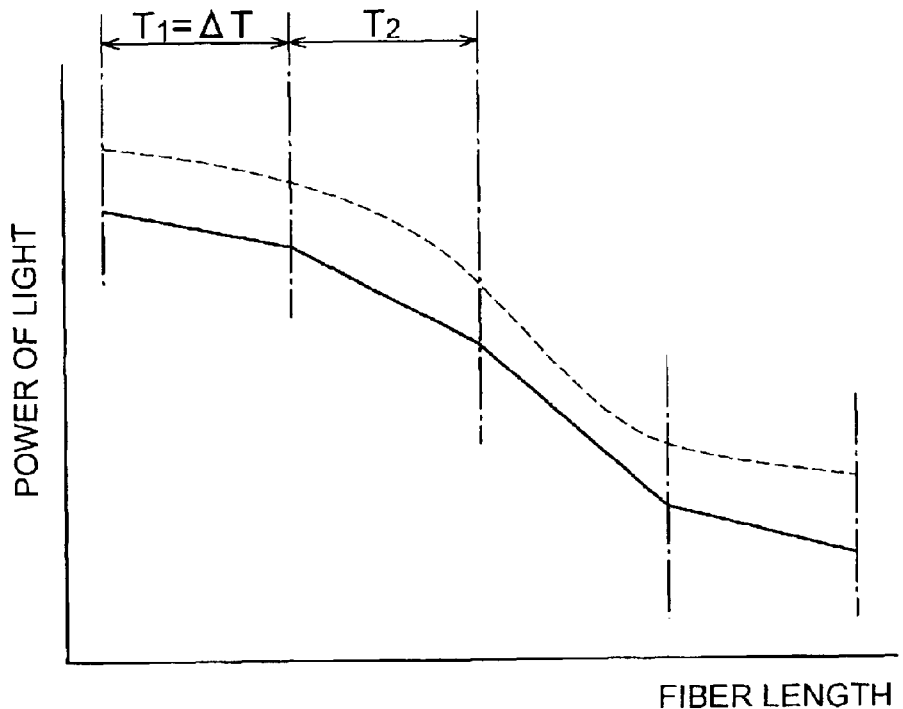
FIG. 16 is a graph illustrating how to produce zones for an OTDR waveform using the step method.

FIG. 16 is a graph illustrating how to produce zones for an OTDR waveform using the step method. According to the step method, when a waveform is divided into plural zones, each having a zone width T, a constant movement amount $\Delta T$ (step amount) is defined to be not less than the zone width T. Then, plural zones are produced by moving the zone in the movement amount $\Delta T$.

In the example shown in FIG. 16, the movement amount $\Delta T$ for the zone is defined equal to the zone width T ($\Delta T=T$). Then, when making the zone width move the movement amount $\Delta T$ in a step-wise fashion from the first zone $T_1$ ($=T$) along the axis, the second zone $T_2$ is produced and further when making the zone width move in the same manner, the rest of zones is produced. Thereafter, an approximated linear line is determined for each of the plural zones thus produced. The above-described zone producing method enables high speed processing because of its simplified calculation algorithm, allowing evaluation of optical fiber such as a calculation of the gradient and a detection of the anomaly in a reduced period of time.

Figure 17:
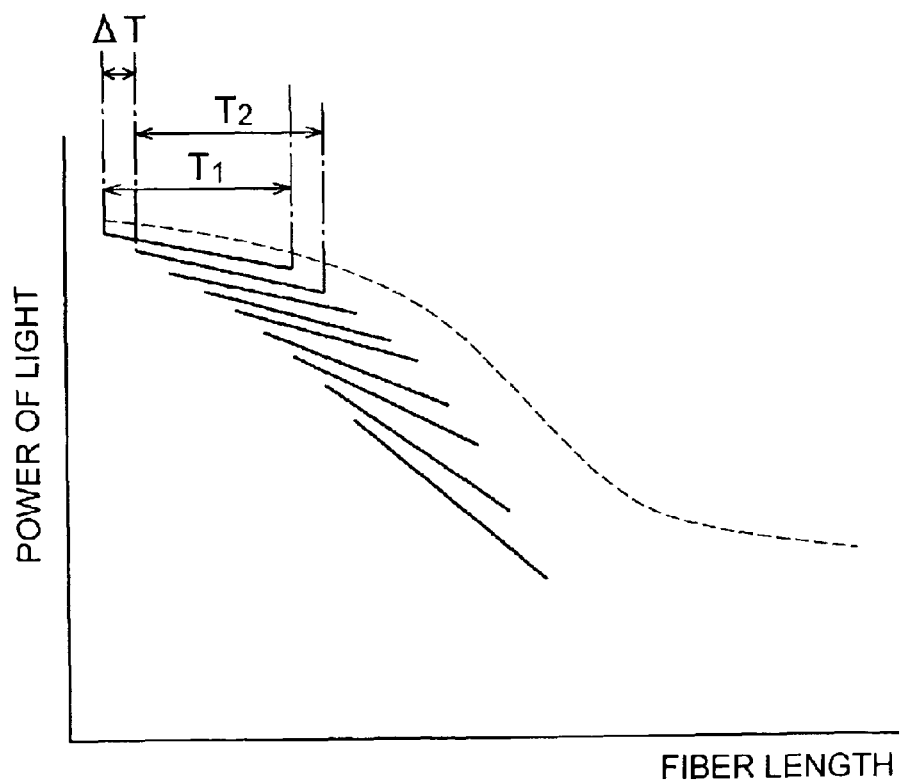
FIG. 17 is a graph illustrating how to produce zones for an OTDR waveform using the slide method.

FIG. 17 is a graph illustrating how to produce zones for an OTDR waveform using the slide method. According to the slide method, when a waveform is divided into plural zones, each having a zone width T, a movement amount $\Delta T$ (slide amount) is defined to be less than the zone width T. Note that the movement amount $\Delta T$ can optionally be defined. Then, plural zones are produced by moving the zone width gradually in the movement amount $\Delta T$.

In the example shown in FIG. 17, the movement amount $\Delta T$ of the zone is defined sufficiently smaller than the zone width T ($\Delta T<T$). Then, when making the zone width move the movement amount $\Delta T$ in a slide-wise fashion from the first zone $T_1$ along the axis, the second zone $T_2$ is produced and further when making the zone width move in the same manner, the rest of zones is produced. Thereafter, an approximated linear line is determined for each of the plural zones thus produced. The above-described zone production method enhances reproducibility of the gradients of the waveform, increasing an accuracy of an evaluation of an optical fiber such as a calculation of the gradient and a detection of the anomaly.

Figure 18:
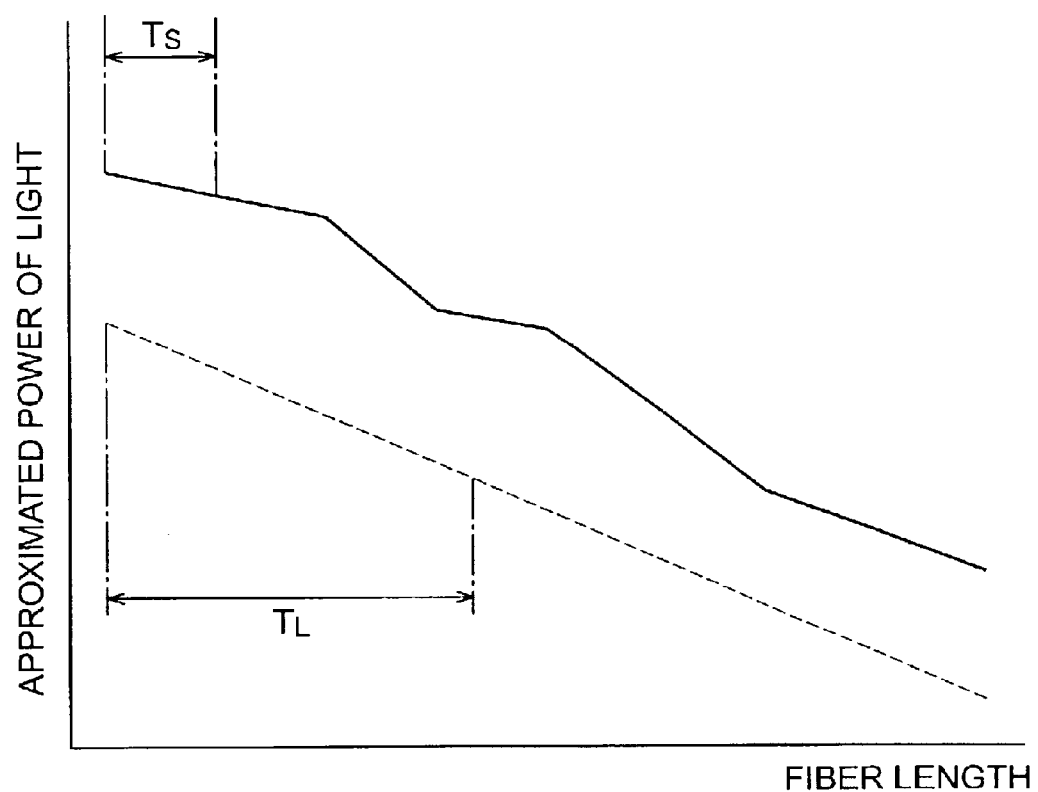
FIG. 18 is a graph used for comparing two approximated waveforms with one another, those waveforms being produced by applying different zone widths to an OTDR waveform.

Furthermore, when dividing a waveform into plural zones, a zone width used for dividing should also be determined to produce a width suitable for an evaluation of an optical fiber. FIG. 18 is a graph used for comparing two approximated waveforms with one another, those waveforms being produced by applying different zone widths to an OTDR waveform. In the graph, a solid line indicates an approximated waveform consisting of approximated linear lines that are determined for plural zones, each zone being produced by dividing a waveform by a short zone width $T_S$, and a dashed line indicates an approximated waveform consisting of approximated linear lines that are determined for plural zones, each zone being produced by dividing a waveform by a long zone width $T_L$.

As shown in FIG. 18, when a zone width for a determination of an approximated linear line is short, reproducibility of the gradients of the waveform is high and an anomaly is evaluated with high accuracy, but when the zone width is too short, the gradients of the waveform are easily affected by small variations in the waveform due to noise, probably determining a normal zone as a zone anomaly. On the other hand, when a zone width for a determination of an approximated linear line is long, the gradients of the waveform are rarely affected by small variations in the waveform due to noise, allowing an accurate evaluation of an anomaly, but when the zone width is too long, the accuracy for an evaluation of an anomaly is lowered. Accordingly, when evaluating an OTDR waveform, it is preferable to define a suitable zone width taking into account the characteristics of a measurement system for a determination of the waveform and detailed conditions applied to an evaluation method to be employed.

Subsequently, a method for a detection of an anomaly within an optical fiber through a use of a deviation between an OTDR waveform and an approximated linear line in each zone will be explained with reference to detailed examples.

In the above-described optical fiber inspecting system, inspecting method and selecting method, an anomaly within an optical fiber is detected using the value of the gradient of an approximated linear line, which value corresponds to zone loss in each zone that is produced by dividing a waveform. Note that depending on a zone width produced by the dividing operation and a start point at which the dividing operation begins, the gradient of an approximated linear line determined for a divided zone probably takes a normal value even when a zone anomaly such as a swell-shaped anomaly exists in the zone along an optical fiber. In order to prevent such probability, it is preferable to determine the gradient of an approximated linear line and then again, determine through use of a deviation between a waveform and an approximated linear line within the corresponding zone.

Figure 19A:
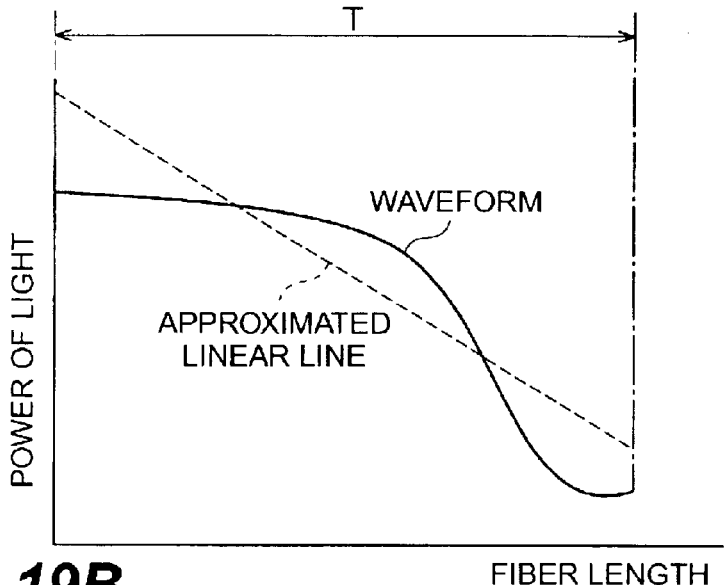
FIGS. 19A to 19C are graphs illustrating an example of (A) an OTDR waveform and an approximated linear line, (B) a deviation between the waveform and the approximated linear line, and (C) the waveform and a re-approximated linear line.
Figure 19B:
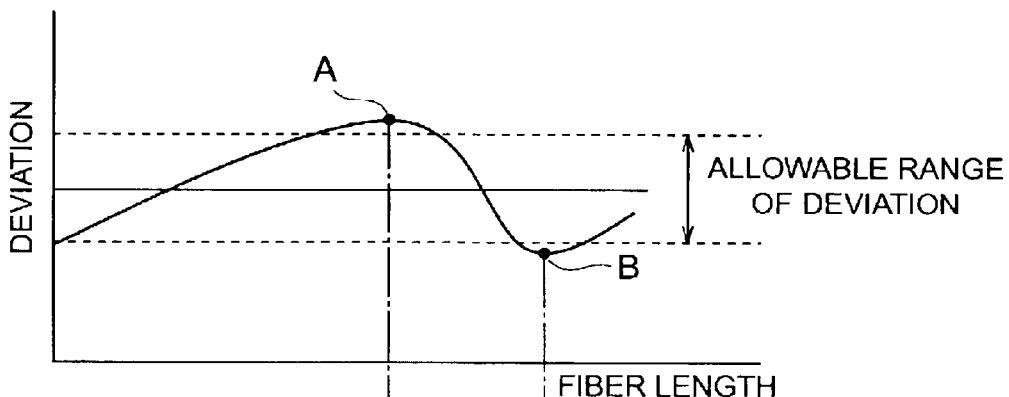
Figure 19C:
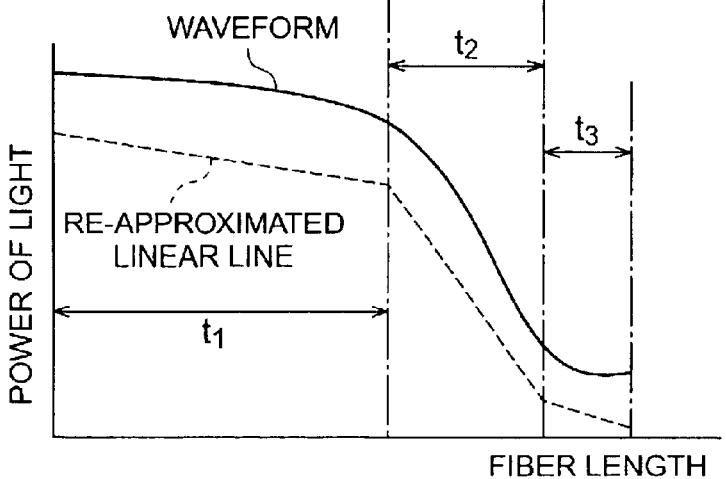

FIGS. 19A to 19C are graphs illustrating an example of (A) an OTDR waveform and an approximated linear line, (B) a deviation between the waveform and the approximated waveform, and (C) the waveform and a re-approximated linear line.

In the example, as shown in FIG. 19A, although a swell-shaped anomaly is observed in an OTDR waveform (solid line) in a zone T, which zone is produced by dividing a waveform by a specific zone width, the value of the gradient of an approximated linear line (dashed line) determined for a waveform in the zone T is within an allowable range of gradient due to its swell-shape. In this case, it can be concluded that a determination using the gradient of an approximated linear line does not enable to detect an anomaly within an optical fiber.

In contrast, as shown in FIG. 19B, a deviation between a waveform and an approximated linear line within the zone T is determined and the value of the deviation is compared with a previously defined allowable range of deviation. In this case, owing to the swell-shaped anomaly shown in FIG. 19A, the value of the deviation becomes outside the allowable range of deviation within a part of the zone T and then, although the gradient of the approximated linear line is normal, the probability of the existence of an anomaly within the zone T is determined.

As described above, regarding a zone in which the value of a deviation is outside the allowable range of deviation, it is preferable to re-divide a waveform within the zone T into plural zones and again determine for a waveform within the zone T. This allows an accurate and reliable detection of an anomaly within a zone width, which is used to divide a waveform. Regarding a detailed method for re-dividing a zone, a variety of methods, for example, including previously defining a zone width for a re-dividing operation may be employed. Note that it is preferable to define a suitable zone width taking into account the influence of noise etc., as is already explained in the description of the previous case where a waveform is first divided to have a zone width.

In FIGS. 19A to 19C, an example in which a zone is re-divided using a local maximum and local minimum of the profile of a deviation between a waveform and an approximated linear line is shown. That is, based on a change in the deviation in the time domain, shown in FIG. 19B, a local maximum point A and a local minimum point B on the deviation waveform are detected in portions of the waveform, which portions are outside the allowable range of deviation. Then, as shown in FIG. 19C, the zone T is re-divided with reference to the points A, B as re-dividing points into three zones, $t_1$, $t_2$ and $t_3$, and thereafter, a determination of a re-approximated linear line, a calculation of the gradient of the approximated linear line within each sub-zone and a detection of an anomaly within an optical fiber through a use of the calculated gradients are again performed. This further increases an accuracy of detection of an anomaly within an optical fiber.

Figure 20:
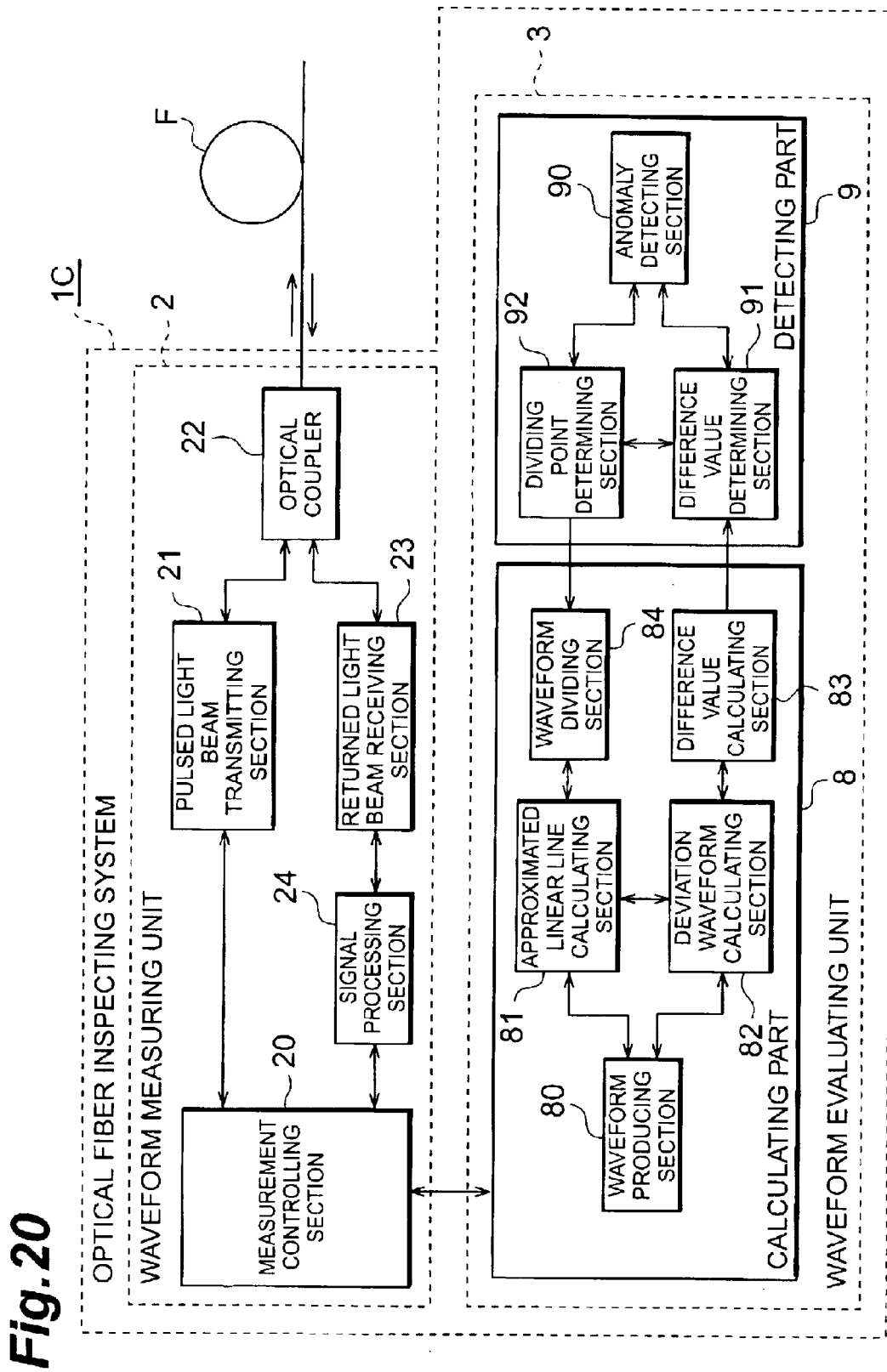
FIG. 20 is a block diagram illustrating the configuration of a third embodiment of an optical fiber inspecting system according to the present invention.

FIG. 20 is a block diagram illustrating the configuration of a third embodiment of an optical fiber inspecting system according to the present invention. The optical fiber inspecting system 1C comprises a waveform measuring unit 2 for a measurement of an OTDR waveform and a waveform evaluating unit 3 for evaluation of a measured waveform. Furthermore, the waveform evaluating unit 3 comprises a calculating part 8 for calculation of a data value necessary for an evaluation of an optical fiber and a detecting part 9 for determination of whether or not an anomaly is present within an optical fiber through a use of the calculated data value. In this embodiment, the configuration of the waveform measuring unit 2 is the same as that of the corresponding unit of the first embodiment.

The waveform evaluating unit 3 corresponding to an OTDR evaluating system (OTDR inspecting system) will be explained below. The waveform evaluating unit 3 of the embodiment comprises the calculating part 8 and the detecting part 9.

The calculating part 8 includes a waveform producing section 80, an approximated linear line calculating section 81, a deviation waveform calculating section 82, a difference value calculating section 83 and a waveform dividing section 84. The waveform producing section 80 receives necessary data such as the sampling data indicating the power of a returned light beam and collected by the measurement controlling section 20 of the waveform measuring unit 2, and based on those data, produces an OTDR waveform of the power of the returned light beam in the time domain. A time delay observed in the waveform in the time domain corresponds to the location along the optical fiber F as described above.

It should be noted that when statistical variations in the sampling data indicating the power of the returned light beam and acquired by the waveform measuring unit 2 are large, if necessary, waveform data are processed using numerical smoothing such as a moving average algorithm by the waveform producing section 80 and then plural data points indicative of a waveform are produced.

The approximated linear line calculating section 81 determines an approximated linear line for an entire OTDR waveform produced by the waveform producing section 80 (approximated linear line calculating step). The approximated linear line is determined by, for example, applying a least-square method to the plural data points indicative of a waveform. Furthermore, the deviation waveform calculating section 82 determines a deviation waveform based on a difference between the waveform produced by the waveform producing section 80 and the approximated linear line calculated by the approximated linear line calculating section 81 (deviation waveform calculating step).

Additionally, based on the calculated deviation waveform, the difference value calculating section 83 calculates the difference value of a deviation representing the amount of the deviation of the waveform from the corresponding linear line (difference value calculating step). The difference value determined for the deviation waveform is used by the detecting part 9 to detect an anomaly within an optical fiber and used for inspection/selection of the optical fiber based on the detection. In more detail, based on the deviation waveform calculated by the deviation waveform calculating section 82, the difference value calculating section 83 determines a first reference value corresponding to the maximum or a local maximum of the deviation and a second reference value corresponding to the minimum or a local minimum of the deviation. Then, the difference value of the deviation is calculated using the difference between the first and second reference values.

The detecting part 9 includes a difference value determining section 91, an anomaly detecting section 90 and a dividing point determining section 92.

In the difference value determining section 91, an allowable condition is previously defined for the difference value, which is determined based on the deviation waveform corresponding to the OTDR waveform calculated by the difference value calculating section 83. The difference value determining section 91 determines whether or not the calculated difference value, which is determined based on the deviation waveform, meets the specific condition and then detects an anomaly within an optical fiber (difference value determining step). Regarding the allowable condition for the difference value of the deviation, for example, an allowable range of deviation is defined as an allowable range of numerical values.

Moreover, the anomaly detecting section 90 detects the presence of an anomaly within the optical fiber F to be inspected and the location of the anomaly based on the result of the determination by the difference value determining section 91 etc. (anomaly detecting step).

In addition to the inspection of the optical fiber F using a detection of an anomaly, the optical fiber F can be selected by an automatic or manual determination by an operator. In selecting optical fibers, the optical fiber F is selected based on the result of the determination by the difference value determining section 91 or the anomaly detecting section 90, for example, selecting only difference values for the deviation waveform, which value meets the specific condition (selecting step).

Furthermore, when an anomaly within the optical fiber F is determined by the difference value determining section 91 and the anomaly detecting section 90, the dividing point determining section 92 determines a dividing point at which the optical fiber F is divided into at least two sub-optical fibers to produce sub-optical fibers containing reduced anomaly (dividing point determining step). When the dividing point is determined for the optical fiber F, the dividing point determining section 92 sends to the waveform dividing section 84 of the calculating part 8 a directive signal indicating that the waveform dividing section 84 should divide a waveform.

The waveform dividing section 84 divides an OTDR waveform into two or more waveforms using a dividing point corresponding to the dividing point that is determined along the optical fiber F by the dividing point determining section 92 (waveform dividing step). Then, a calculation of an approximated linear line by the approximated linear line calculating section 81, a calculation of a deviation waveform by the deviation waveform calculating section 82, a calculation of a difference value of a deviation by the difference value calculating section 83 and a detection of anomalies within an optical fiber by the difference value determining section 91 based on difference values, are repeatedly executed for each divided waveform.

Beneficial effects produced by the optical fiber inspecting system, the inspecting method and the selecting method according to the embodiment will be explained below.

In the optical fiber inspecting system shown in FIG. 20 and the inspecting/selecting methods using the system, an OTDR waveform is measured by the waveform measuring unit 2 and the difference value of deviation representing the amount of the deviation of waveform from a linear line is calculated, based on the deviation waveform determined as a deviation between the OTDR waveform and the approximated linear line. Then, an anomaly within the optical fiber F is detected depending on whether or not the calculated difference value meets a specific condition. In this manner, an anomaly within an optical fiber is accurately and reliably detected even when the optical fiber is considered to be normal judging from a loss in the optical fiber.

Specifically, employing the difference value for the detection of anomalies calculated using the maximum or a local maximum value and the minimum or a local minimum value of the deviation in the deviation waveform, the amount of the deviation of the waveform from a linear line and the magnitude of an anomaly within an optical fiber can be correctly detected. The above-described detecting method is useful for an evaluation of anomalies such as a wide range of deviation anomalies within an optical fiber. Note that detailed method for detecting anomalies within an optical fiber through a use of difference values in a deviation waveform will be described later.

Furthermore, in the embodiment, when an anomaly within an optical fiber is detected by the evaluation using the difference value of the deviation, a dividing point is determined so that dividing the optical fiber F enables an optical fiber to have reduced anomaly. In this manner, by determining the suitable dividing point of the optical fiber for the anomaly detected by the above-described method, such as a wide range of the deviation anomaly, the optical fiber detected to contain an anomaly can be used to be divided into two or more optical fibers with good characteristics.

Additionally, a waveform is divided using the dividing point for the optical fiber and then a calculation and determination of difference values of deviations are repeatedly executed. By using this method, it can be previously detected weather or not each of the two or more optical fibers obtained by the dividing operation becomes an optical fiber with good characteristics when the optical fiber is divided at the determined dividing point.

Moreover, although an anomaly within the optical fiber F by the anomaly detecting section 90 may be detected immediately through the result of the determination by the difference value determining section 91, the detection may also be made using additional and alternative methods for detection of the anomaly together with the current method.

The additional method for a detection of an anomaly, for example, includes calculating the gradients of an OTDR waveform at individual time points and making a detection of an anomaly within an optical fiber depending on whether or not the value of the calculated gradient is within a specific range (e.g., the defined allowable range of gradient). Alternatively, the method includes dividing a waveform into plural zones of a specific zone width and calculating the gradient of a zone approximated linear line for a waveform within each of the plural zones, and detecting an anomaly within an optical fiber depending on whether or not the value of the calculated gradient is within a specific range (e.g., the defined allowable range of gradient).

As described above, employing the detecting method that uses the gradients of waveform at individual time points or the gradient of an approximated linear line determined for a waveform in each zone together with a method for a detection of an anomaly within an optical fiber through a use of the difference value of a deviation determined for a deviation waveform enables to detect further accurately and reliably an anomaly within an optical fiber.

A method for detection of an anomaly within an optical fiber through a use of the difference value of a deviation determined for a deviation waveform corresponding to an OTDR waveform will be explained with reference to detailed examples. Note that an axis of abscissas in each of the following graphs indicates a fiber length (corresponding to locations along the optical fiber F to be evaluated). The fiber length corresponds to a time delay equal to a time interval over which the pulsed light beam is transmitted from the pulsed light beam transmitting section 21 and the returned light beam is received by the returned light beam receiving section 23.

Figure 21A:
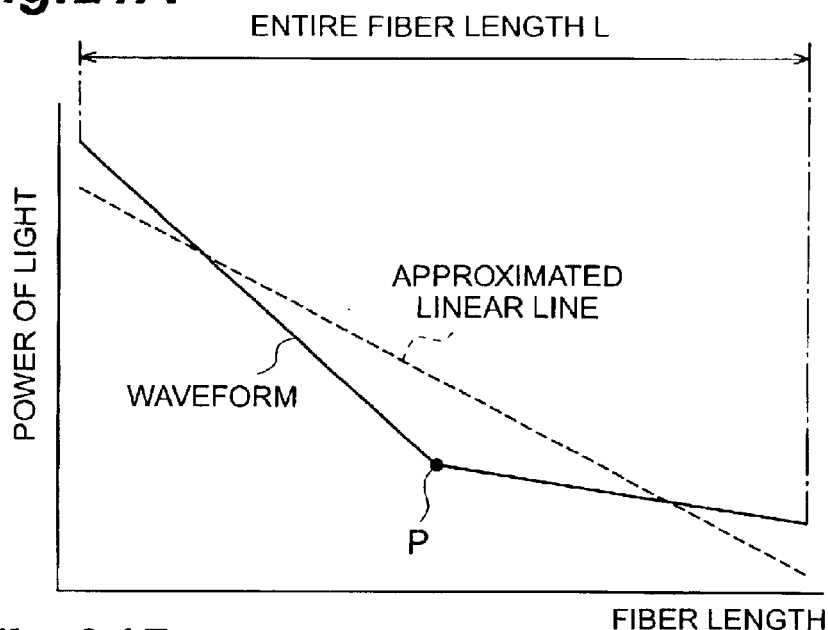
FIGS. 21A to 21C are graphs illustrating an example of (A) an OTDR waveform and an approximated linear line, (B) a deviation waveform, and (C) a change of a gradient of the waveform in the time domain.
Figure 21B:
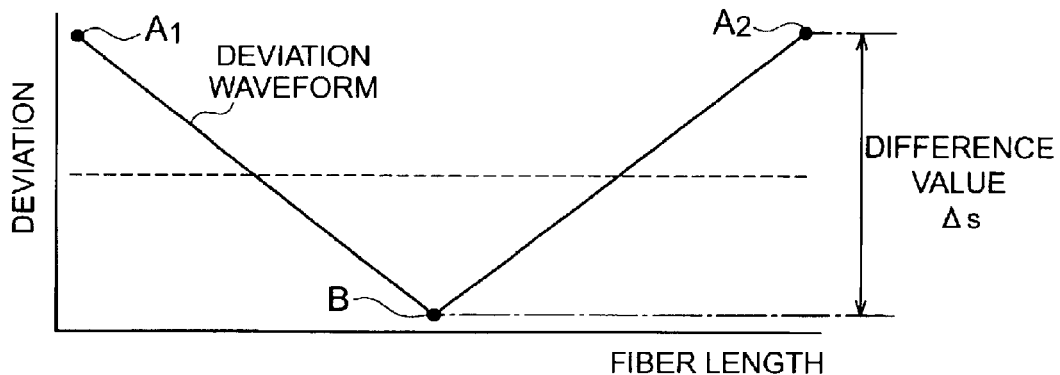
Figure 21C:
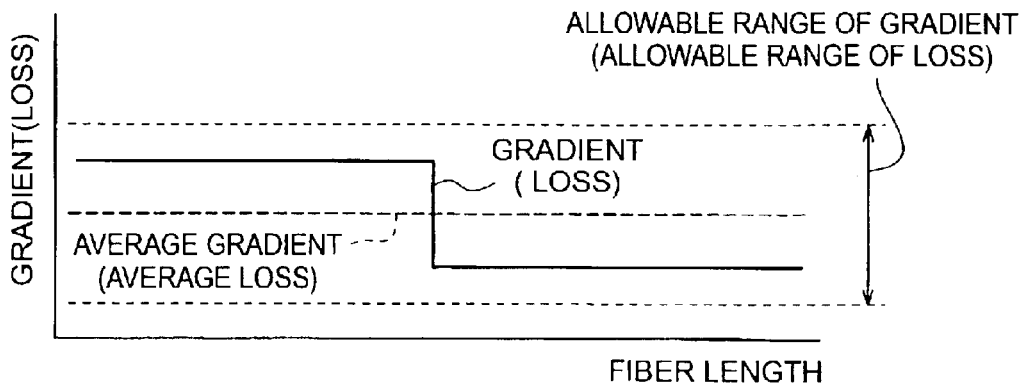

FIGS. 21A to 21C are graphs illustrating an example of (A) an OTDR waveform and an approximated linear line, (B) a deviation waveform, and (C) a change of a gradient of the waveform in the time domain.

In the example, as shown in FIG. 21A, an optical fiber having a specific entire fiber length L (e.g., L=50 km) is exemplified and an OTDR waveform (denoted by solid line) measured for the fiber has the values of gradients different on both sides of a point P centrally positioned along the fiber. Then, an approximation method such as a least-square method is applied to the waveform to obtain an approximated linear line (denoted by dashed line). Note that the gradient of waveform or approximated linear line corresponds to a loss at each position along the optical fiber. An average loss determined by the approximated linear line is, for example, about 0.200 dB/km.

A deviation waveform is determined based on the waveform and the approximated linear line, and using a deviation equal to a difference between the values of the waveform and the approximated linear line at each location along the fiber. Then, a difference value representing the amount of the deviation is determined for the deviation waveform. In the exemplified deviation waveform shown in FIG. 21B, the deviations become the maxima at points $A_1$ and $A_2$, both located at both ends of the deviation waveform. In this case, the deviations at the points $A_1$ and $A_2$ are a first reference value used for a calculation of a difference value. The deviation becomes the minimum (a local minimum) at a point B corresponding to the point P and located at the central position along the deviation waveform. In this case, the deviation at the point B is a second reference value. Then, a difference value $\Delta s$ (e.g., $\Delta s=0.1$ dB) is determined for the deviation waveform, based on a difference between the first and second reference values.

An allowable range of deviation is previously defined as an allowable range of numerical values, i.e., an allowable condition for the difference value of the deviation, for the difference value Δs determined for the deviation waveform. Then, the calculated difference value Δs and the allowable range of deviation are compared with each other and when the difference value Δs is outside the allowable range of deviation, for example, the difference value is greater than the upper limit of the allowable range, the optical fiber is detected to contain a deviation anomaly. The above-described method for an evaluation of optical fibers also enables to detect accurately and reliably an anomaly such as a wide range of deviation anomalies shown in FIG. 21A.

Furthermore, the graph of FIG. 21C indicates the gradient of the OTDR waveform and the approximated linear line, both shown in FIG. 21A. In the graph, the dashed line indicates the average value of the gradients, which value is determined for the approximated linear line and corresponds to the entire waveform. The value corresponds to average loss over the entire optical fiber, having a fiber length L, to be evaluated. In addition, the solid line indicates a change in the value of the gradient of the waveform at each location. The change corresponds to a change in loss at each location along an optical fiber. In this example, the value of the gradient, denoted by the solid line, changes in a step fashion at the point P approximately located at the central position along the optical fiber.

It should be noted that the optical fiber, which is represented by the OTDR waveform shown in FIG. 21A, is essentially configured to have two optical fibers containing cores substantially different from one another and connected to each other at the point P, which configuration is due to variations in core during manufacture of the optical fiber. In the optical fiber thus configured, core diameter changes at the point P within the optical fiber and loss in an optical fiber and characteristic values such as an effective cross section Aeff of the core, mode field diameter and dispersion change accordingly. In FIG. 21C, one example is illustrated in which the value of loss changes at the point P in a step fashion.

In order to evaluate the optical fiber thus configured, an approximated linear line is determined for an OTDR waveform and loss in an optical fiber is calculated based on the gradients of the line, and then, average loss over the former and latter portions of an optical fiber, which portions are separated from one another at the point P, is determined as apparent value of loss. As is the case with the determination of the loss in an optical fiber, when characteristics of the optical fiber other than loss, such as dispersion, are evaluated, the averaged and apparent value is determined. Regarding the optical fiber whose average characteristics have been evaluated, when the entire optical fiber of a length of 50 km is divided into two optical fibers of a length of 25 km, the two optical fibers after the dividing operation have characteristics different from those obtained by evaluating the optical fiber before the dividing operation, as clearly shown in FIG. 21A.

For example, assume that an average dispersion in an optical fiber has been evaluated before the dividing operation and the optical fiber is divided into two optical fibers, and then, a dispersion compensation is applied for each of the two optical fibers. When the dispersion in the optical fiber after the dividing operation is compensated for based on the value of average dispersion in an optical fiber before the dividing operation, it will not be correctly compensated for. In recent years, in order to provide high rate/capacity optical transmission, a Waveguide-Division Multiplexing (WDM) transmission system has been developed and is now in use. For the WDM transmission system, various schemes have been proposed to suppress the occurrence of non-linearity effect and then prevent information degradation, increasing the amount of transmittable information. In contrast, when a wavelength dispersion through an optical transmission is not sufficiently compensated for, optical signal transmission over a network degrades.

In contrast, according to the above-described detecting method for detecting a deviation anomaly based on a waveform and an approximated linear line, and then, detecting an anomaly within an optical fiber, even an anomaly, which is observed so that the characteristic values change at the mid-position along an optical fiber, can accurately and reliably detected.

It should be noted that, for example, two kinds of methods, i.e., a method using data points and a method using zones can be employed as a detailed method for a determination of first and second reference points on a deviation waveform and calculation of the difference value of the deviation through the determination.

Figure 22A:
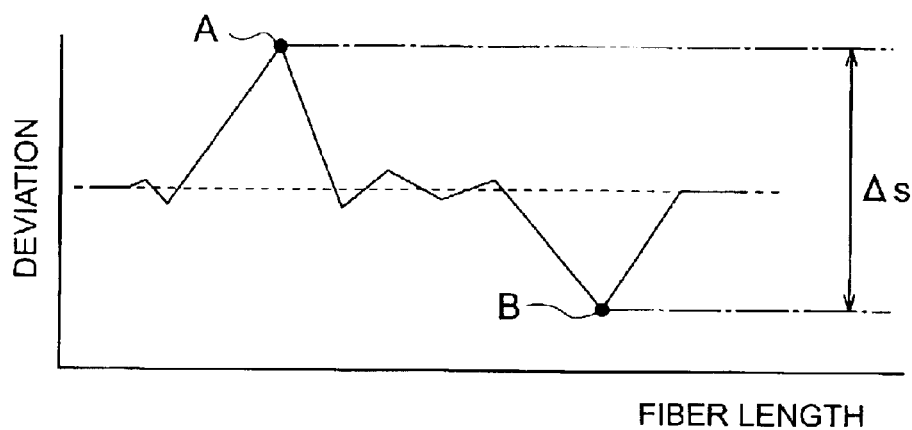
FIGS. 22A and 22B are graphs illustrating (A) how to calculate the difference value of deviations based on data points, and (B) how to calculate the difference value of deviations based on zones, determined for the deviation waveform.
Figure 22B:
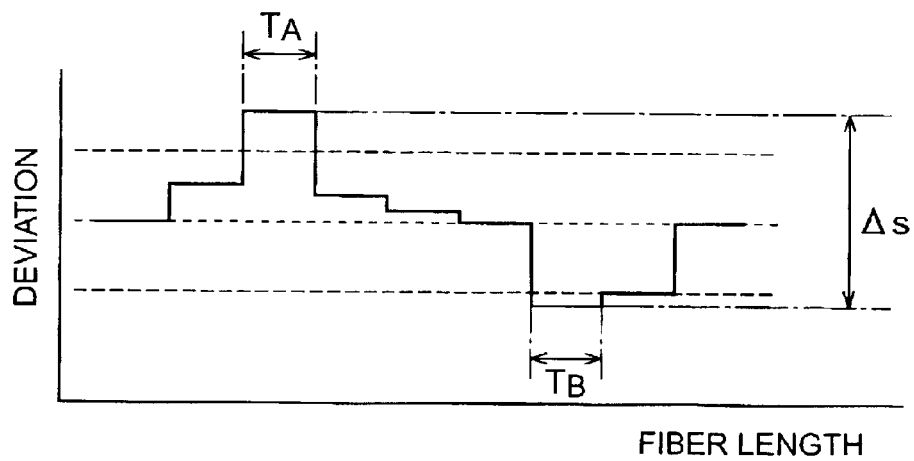

FIG. 22A is a graph illustrating how to calculate the difference value of the deviations using data points indicative of a deviation waveform. FIG. 22B is a graph illustrating how to calculate the difference value of the deviations using zones determined for a deviation waveform.

First, according to the method for a calculation of the difference value of the deviations through a use of data points indicative of a deviation waveform, as shown in FIG. 22A, a first reference point A at which a deviation becomes the maximum or a local maximum and a second reference point B at which the deviation becomes the minimum or a local minimum are detected in plural data points indicative of a deviation waveform. Then, the value of the deviation at the first reference point A is defined as a first reference value and the value of the deviation at the second reference point B is defined as a second reference value, a difference value Δs of the deviation is calculated based on a difference between the first and second reference values. When employing the above-described method, a deviation waveform can be reproduced in a detailed manner and then the location of an anomaly within an optical fiber can be detected with a high accuracy.

Furthermore, according to the method for a calculation of the difference value through a use of zones determined for a deviation waveform, as shown in FIG. 22B, the deviation waveform is previously divided into plural zones of a specific zone width T and a deviation is averaged within each zone, and a first reference zone $T_A$ at which a deviation becomes the maximum or a local maximum and a second reference zone $T_B$ at which the deviation becomes the minimum or a local minimum are detected in the plural zones. Then, the value of deviation at the first reference zone $T_A$ is defined as a first reference value and the value of the deviation at the second reference zone $T_B$ is defined as a second reference value, and a difference value Δs of the deviation is calculated based on a difference between the first and second reference values. When employing the above-described method, influence of minute variations due to noise on a deviation waveform can be reduced and an anomaly within an optical fiber can accurately and reliably be detected.

Subsequently, an additional method for a detection of an anomaly within an optical fiber through a use of the gradient of an OTDR waveform will be explained below.

In the above-described optical fiber inspecting/selecting methods, an approximated linear line is determined for an OTDR waveform (FIG. 21A) and the waveform of a deviation between the waveform and the approximated linear line is calculated (FIG. 21B). Then, an anomaly within an optical fiber is detected based on the difference value determined for the calculated deviation waveform. Thereafter, an additional detection of an anomaly is made using the gradient of OTDR waveform, enabling to detect a various types of anomalies.

FIG. 21C is a graph illustrating the gradient of an OTDR waveform corresponding to loss in an optical fiber, which gradient, as described above, changes in a step fashion at the point P. When detecting an anomaly using the gradient of waveform, an allowable range of gradient (allowable range of loss) is previously defined for the value of the gradient (loss) with reference to a value such as an average value of the gradients of an approximated linear line. Then, the calculated value of the gradient and the allowable range of gradient are compared with each other, and when the value of the gradient is outside the allowable range of gradient, an optical fiber is detected as containing a gradient anomaly (loss anomaly).

Although a deviation anomaly is detected using a relative value, a gradient anomaly can be detected using an absolute value. The detecting method using an absolute value is effective for detection of a local anomaly and a zone anomaly. Accordingly, simultaneous employment of those detecting methods enables to detect a various types of anomalies. Detailed numerical values are as follows. For example, average loss is determined as being 0.200 dB/km for an approximated linear line and an allowable range of loss is defined as being 0.150 to 0.250 dB/km with reference to the average loss. Under those assumptions, when a change in the loss determined for an OTDR waveform is 0.190 to 0.210 dB/km, the change is determined as being within the allowable range of loss and then an optical fiber is detected as not containing a loss anomaly.

In order to determine the gradient of the waveform for detection of such a gradient anomaly, for example, a method for determination of gradient through a use of data points indicative of a waveform at individual time points may be employed. In this case, the value of the gradient is determined based on a difference between the adjacent data points. Alternatively, a method including: dividing a waveform into plural zones; and determining a zone approximated linear line for each of the plural zones; and then, determining the gradient of the zone approximated linear line as the gradient of the waveform, maybe employed. In this case, the value of the gradient is determined for each zone.

It should be noted that the detecting method using the gradient of a waveform or an approximated linear line is apt to suffer from the influence of minute variations due to noise on a waveform as compared to the detecting method using the difference value of the deviations. Accordingly, it is preferable to detect an anomaly within an optical fiber through combination of a detection of a gradient anomaly (loss anomaly) and a detection of a deviation anomaly while taking into account the influence of such minute variations.

How to combine a detection of a gradient anomaly and a detection of a deviation anomaly is, for example, as follows. First, when both a deviation and a gradient are normal, the optical fiber in problem is detected as normal. When a deviation is abnormal and a gradient is normal, a dividing point is determined for an optical fiber. When a deviation is normal and a gradient is abnormal, and further when a local anomaly is detected, the optical fiber in problem is detected as abnormal, and when a zone anomaly is detected, the detection of the zone anomaly is considered an erroneous detection due to noise and therefore, the optical fiber in problem is detected as normal. Furthermore, when both a deviation and a gradient are abnormal, the optical fiber in problem is detected as abnormal. Additionally, possible combination, different from the above-described combination, of a detection of a deviation anomaly and a detection of a gradient anomaly may be employed.

How to determine a dividing point along an optical fiber and how to re-detect an anomaly within an optical fiber after a determination of the dividing point will be explained below.

FIGS. 23A to 23D are graphs illustrating an example of (A) an OTDR waveform and an approximated linear line, (B) a deviation waveform, (C) a deviation waveform for a divided front portion, and (D) a deviation waveform for a divided rear portion.

Figure 23A:
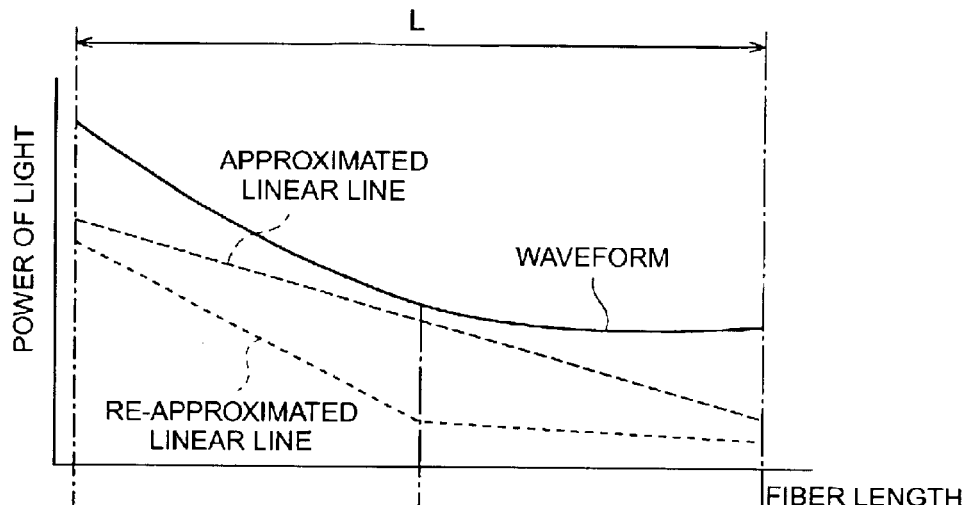
FIGS. 23A to 23D are graphs illustrating an example of (A) an OTDR waveform and an approximated linear line, (B) a deviation waveform, (C) a deviation waveform for a divided front portion, and (D) a deviation waveform for a divided rear portion.

In this example, as shown in FIG. 23A, an optical fiber to be inspected of a fiber length L is exemplified and an OTDR waveform measured for the fiber exhibits gradually-decreasing the gradient of waveform from its front portion toward rear portion. When the above-described waveform is obtained, the deviation waveform shown in FIG. 23B and determined based on a waveform and an approximated linear line is referred and a point D at which the deviation becomes a minimum can be made to be a dividing point for an optical fiber. The use of the point D determined as described above allows an optical fiber exhibiting a large difference value $\Delta s$ and having a fiber length L to be divided into two optical fibers, i.e., a front portion exhibiting a large gradient and having a fiber length $L_1$ and a rear portion exhibiting a small gradient and having a fiber length $L_2$.

When the dividing point D is determined as described above, the OTDR waveform is divided by the dividing point D and a calculation/determination of difference value of deviations is repeatedly executed for individual portions of the waveform, enabling the characteristics of the individual optical fibers obtained by the dividing operation to previously be detected.

That is, as shown in FIG. 23A, a re-approximated linear line is determined for a waveform corresponding to each of the portions, i.e., the front portion of a fiber length $L_1$ and the rear portion of a fiber length $L_2$. Then, a deviation waveform (FIG. 23C) corresponding to the front portion and a deviation waveform (FIG. 23D) corresponding to the rear portion, both portions obtained by the dividing operation through a use of the dividing point D, are determined based on a difference between the waveform and the re-approximated linear line, and an anomaly within the optical fiber after the dividing operation is detected based on the difference value determined for the individual deviation waveforms.

Regarding the result of the determination by the above-described operation, when the difference values of the individual deviations meet a allowable condition, it can be concluded that two normal optical fibers are obtained by dividing the optical fiber by the dividing point D. Furthermore, a loss anomaly through a use of a waveform or a zone approximated linear line may further be detected for the front and rear portions of the waveform, both portions corresponding to the optical fibers after the dividing operation, in addition to a detection of a deviation anomaly through a use of the difference value of deviation.

Figure 23B:
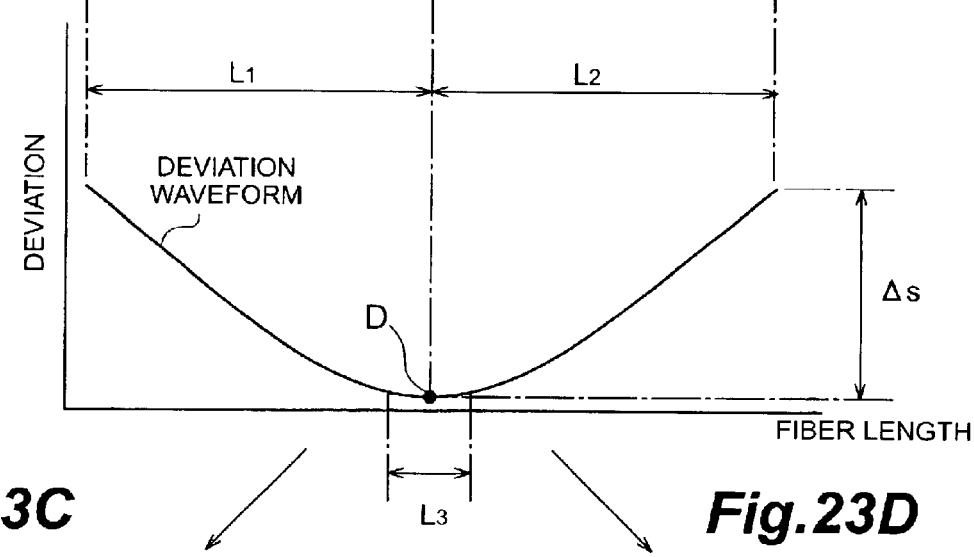
Figure 23C:
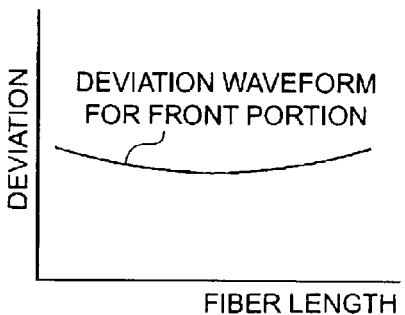
Figure 23D:
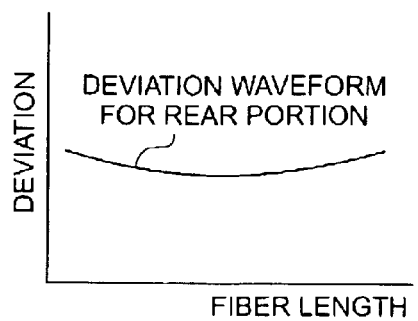

Additionally, in the above-described example, as shown in FIG. 23B, the local minimum point of the deviations is determined as the dividing point D. However, as for a method for determination of a dividing point, a dividing point may be determined according to another method depending on the profiles of individual waveforms. For example, when an OTDR waveform exhibiting gradually-increasing gradients of waveform from the front portion of the OTDR waveform toward the rear portion is obtained, a local maximum point of the deviations may be determined to be a dividing point.

Furthermore, in the case where rapid changes in the deviation between a waveform and an approximated linear line, and the gradient of a waveform are observed in a certain range along an optical fiber and in the vicinity of the dividing point D, when the optical fiber is going to be divided, preferably, a specific range (e.g., a fiber length $L_3$ shown in FIG. 23B) in the vicinity of the dividing point D is excluded.

The optical fiber selecting method and the inspecting system using the method according to the present invention are not limited to the above-described embodiments and the examples, and therefore, various modifications and improvements can be made to and in the above-described embodiments and the examples without departing from the spirit and scope of the objects of the present invention. For instance, the optical fiber inspecting system of each of the above-described embodiments, which is configured to include the waveform measuring unit 2 as an OTDR waveform measuring system provided together with the waveform evaluating unit 3 for an evaluation of an anomaly within an optical fiber through a use of OTDR waveform, is illustrated. Instead of the above-described configuration, the optical fiber inspecting system may be configured not to include the measuring unit for acquiring an OTDR waveform and then may be configured to inspect/select of an optical fiber by retrieving an OTDR waveform as data measured by the independent measuring unit and evaluating the waveform.

Moreover, an allowable range determined for a gradient, an amount of change in gradient, a deviation, etc., is not necessarily made to be constant, but may be a variable range of numerical values. Additionally, in the configuration shown in FIG. 20, when only a detection of an anomaly within an optical fiber needs to be made, the inspecting system may be configured not to determine dividing points along an optical fiber and re-detection of an anomaly within an optical fiber after dividing operation.

As described so far, the optical fiber selecting method and the inspecting system according to the present invention can be employed as a method and a system that enables an accurate and reliable detection of an anomaly within an optical fiber. That is, the configuration, in which the gradient of an OTDR waveform, i.e., the primary differentiation of waveform, or the amount of change in gradient, i.e., the secondary differentiation of the waveform, at each time point is calculated, and then, an anomaly within an optical fiber is detected depending on whether or not the value of the calculated gradient or the calculated amount of change in gradient is within a specific range, enables to detect accurately the presence of an anomaly and the location of an anomaly point, and further, a reliable evaluation of an anomaly within an optical fiber.

Additionally, the configuration, in which the gradient of an waveform is calculated based on the gradient of approximated linear line in each zone, which zone is produced by dividing an OTDR waveform, and then, an anomaly within an optical fiber is detected depending on whether or not the value of the calculated gradient is within a specific range, enables to detect accurately the presence of an anomaly and the location of an anomaly point, and further, a reliable evaluation of an anomaly within an optical fiber.

Furthermore, the configuration, in which the difference value of a deviation representing a deviation of a waveform from a linear line is calculated based on the waveform of a deviation between an OTDR waveform and an approximated linear line and then an anomaly within an optical fiber is detected depending on whether or not the difference value meets a specific condition, enables to evaluate reliably an anomaly within an optical fiber, such as a wide range deviation anomaly. Particularly, the use of the difference value calculated based on the maximum or a local maximum of the deviations and the minimum or local minimum of the deviations enables to evaluate correctly the amount of a deviation of a waveform from a linear line.

What is claimed is:

1. An optical fiber selecting method for selecting an optical fiber through a use of a waveform of a power of a light beam in the time domain, the light beam being measured by inputting a pulsed light beam to an optical fiber to be selected and detecting the light beam returned from said optical fiber, the method comprising:

an approximated linear line calculating step of determining an approximated linear line for said waveform;

a deviation waveform calculating step of determining a deviation waveform based on a difference between said waveform and said approximated linear line;

a difference value calculating step of determining a first reference value of the maximum or a local maximum of the deviation and a second reference value of the minimum or a local minimum of the deviation for said deviation waveform, and calculating a value of a difference between the first reference value and the second reference value; and a selecting step of selecting said optical fiber based on a result of a determination, the result of the determination being obtained by determining whether or not a value of a difference meets a specific condition.

2. The optical fiber selecting method according to claim 1, wherein in said difference value calculating step, said deviation waveform is previously divided into plural zones in the time domain and the difference is determined by averaging the difference in each of the plural zones.

3. The optical fiber selecting method according to claim 1, further comprising a dividing point determining step of determining a dividing point, said dividing point being determined such that an anomaly within said optical fiber can be reduced by dividing said optical fiber at said dividing point, in the case that an anomaly within said optical fiber is detected.

4. The optical fiber selecting method according to claim 3, further comprising a waveform dividing step of dividing said waveform at said dividing point, wherein said approximated linear line calculating step, said deviation waveform calculating step, said difference value calculating step and said selecting step are performed for each of waveforms produced by dividing said waveform.

5. The optical fiber selecting method according to claim 1, wherein in said selecting step, a gradient of said waveform at each time point is calculated and whether or not a value of the calculated gradient is within a specific range is determined, and said optical fiber is selected based on the result of the determination.

6. The optical fiber selecting method according to claim 1, wherein in said selecting step, said waveform is divided into plural zones with a specific zone width and a zone approximated linear line is determined for said waveform within each of the plural zones, and whether or not a value of the gradient of said zone approximated linear line is within a specific range is determined, and said optical fiber is selected based on the result of the determination.

7. An optical fiber inspecting system for inspecting an optical fiber through a use of a waveform of a power of a light beam in the time domain, the light beam being measured by inputting a pulsed light beam to an optical fiber to be inspected and detecting the light beam returned from said optical fiber, the system comprising:

approximated linear line calculating means for determining an approximated linear line for said waveform;

deviation waveform calculating means for determining a deviation waveform based on a difference between said waveform and said approximated linear line;

difference value calculating means for determining a first reference value of the maximum or a local maximum of the deviation and a second reference value of the minimum or a local minimum of the deviation for said deviation waveform, and calculating a value of a difference between the first reference value and the second reference value; and difference value determining means for determining whether or not a value of a difference meets a specific condition.

8. The optical fiber inspecting system according to claim 7, further comprising dividing point determining means for determining a dividing point, said dividing point being determined such that an anomaly within said optical fiber can be reduced by dividing said optical fiber at said dividing point, in the case that an anomaly within said optical fiber is detected.

* * * * *